(12) United States Patent
Ogg et al.

(10) Patent No.: US 7,392,377 B2
(45) Date of Patent: Jun. 24, 2008

(54) SECURED CENTRALIZED PUBLIC KEY INFRASTRUCTURE

(75) Inventors: Craig L. Ogg, Long Beach, CA (US); William W. Chow, Los Angeles, CA (US)

(73) Assignee: Stamps.Com, Santa Monica, CA (US)

( * ) Notice: Subject to any disclaimer, the term of this patent is extended or adjusted under 35 U.S.C. 154(b) by 807 days.

(21) Appl. No.: 10/083,236

(22) Filed: Feb. 26, 2002

(65) Prior Publication Data

US 2002/0178354 A1 Nov. 28, 2002

Related U.S. Application Data

(63) Continuation of application No. 09/690,066, filed on Oct. 16, 2000.

(60) Provisional application No. 60/160,491, filed on Oct. 20, 1999, provisional application No. 60/160,503, filed on Oct. 20, 1999, provisional application No. 60/160,112, filed on Oct. 18, 1999, provisional application No. 60/160,563, filed on Oct. 20, 1999, provisional application No. 60/160,041, filed on Oct. 18, 1999, provisional application No. 60/193,057, filed on Mar. 29, 2000, provisional application No. 60/193,055, filed on Mar. 29, 2000, provisional application No. 60/193,056, filed on Mar. 29, 2000.

(51) Int. Cl.
*H04L 9/00* (2006.01)

(52) U.S. Cl. .......................................... 713/153; 705/50

(58) Field of Classification Search ................... 705/35; 713/153
See application file for complete search history.

(56) References Cited

U.S. PATENT DOCUMENTS

| 4,447,890 A | 5/1984 | Duwel et al. |
|---|---|---|
| 4,725,718 A | 2/1988 | Sansone et al. |
| 4,743,747 A | 5/1988 | Fougere et al. |
| 4,757,537 A | 7/1988 | Edelmann et al. |

(Continued)

FOREIGN PATENT DOCUMENTS

EP 0 360 225 A2 3/1990

(Continued)

OTHER PUBLICATIONS

Pastor, Jose; CRYPTOPOST™—A Cryptographic Application to Mail Processing; Journal of Cryptology; 1991; 137-146pp.; vol. 3; No. 2; International Association for Cryptologic Research.

(Continued)

*Primary Examiner*—Matthew Heneghan
*Assistant Examiner*—Farid Homayounmehr
(74) *Attorney, Agent, or Firm*—Christie, Parker & Hale, LLP

(57) ABSTRACT

An on-line value bearing item (VBI) printing system that includes one or more cryptographic modules and a central database is disclosed. The cryptographic modules are capable of implementing the USPS Information Based Indicia Program Postal Security Device Performance Criteria and other required VBI standards. The modules encipher the information stored in the central database for all of the on-line VBI system customers and are capable of preventing access to the database by unauthorized users. Additionally, the cryptographic module is capable of preventing unauthorized and undetected modification, including the unauthorized modification, substitution, insertion, and deletion of VBI related data and cryptographically critical security parameters.

35 Claims, 10 Drawing Sheets

U.S. PATENT DOCUMENTS

| | | | |
|---|---|---|---|
| 4,775,246 A | 10/1988 | Edelmann et al. | |
| 4,802,218 A | 1/1989 | Wright et al. | |
| 4,812,994 A | 3/1989 | Taylor et al. | |
| 4,831,555 A | 5/1989 | Sansone et al. | |
| 4,837,702 A | 6/1989 | Obrea | |
| 4,853,865 A | 8/1989 | Sansone et al. | |
| 4,900,903 A | 2/1990 | Wright et al. | |
| 4,900,904 A | 2/1990 | Wright et al. | |
| 4,907,268 A | 3/1990 | Bosen et al. | |
| 4,908,770 A | 3/1990 | Breault et al. | |
| 4,933,849 A | 6/1990 | Connell et al. | |
| 4,935,961 A | 6/1990 | Gargiulo et al. | |
| 4,949,381 A | 8/1990 | Pastor | |
| 4,980,542 A | 12/1990 | Jackson et al. | |
| 5,048,085 A | 9/1991 | Abraham et al. | |
| 5,058,008 A | 10/1991 | Schumacher | |
| 5,060,263 A | 10/1991 | Bosen et al. | |
| 5,075,865 A | 12/1991 | Kawamura et al. | |
| 5,111,030 A | 5/1992 | Brasington et al. | |
| 5,142,577 A | 8/1992 | Pastor | |
| 5,181,245 A | 1/1993 | Jones | |
| 5,241,483 A | 8/1993 | Porret et al. | |
| 5,265,221 A * | 11/1993 | Miller | 711/163 |
| 5,319,562 A | 6/1994 | Whitehouse | |
| 5,325,519 A | 6/1994 | Long et al. | |
| 5,341,505 A | 8/1994 | Whitehouse | |
| 5,377,268 A | 12/1994 | Hunter | |
| 5,379,391 A * | 1/1995 | Belsan et al. | 711/114 |
| 5,390,251 A | 2/1995 | Pastor et al. | |
| 5,448,641 A | 9/1995 | Pintsov et al. | |
| 5,454,038 A | 9/1995 | Cordery et al. | |
| 5,471,925 A | 12/1995 | Heinrich et al. | |
| 5,495,411 A | 2/1996 | Ananda | |
| 5,548,645 A | 8/1996 | Ananda | |
| 5,561,795 A | 10/1996 | Sarkar | |
| 5,570,465 A | 10/1996 | Tsakanikas | |
| 5,598,477 A | 1/1997 | Berson | |
| 5,600,562 A | 2/1997 | Guenther | |
| 5,655,023 A | 8/1997 | Cordery et al. | |
| 5,659,616 A | 8/1997 | Sudia | |
| 5,666,421 A | 9/1997 | Pastor et al. | |
| 5,668,897 A | 9/1997 | Stolfo | |
| 5,671,146 A | 9/1997 | Windel et al. | |
| 5,684,951 A | 11/1997 | Goldman et al. | |
| 5,715,314 A | 2/1998 | Payne et al. | |
| 5,729,734 A | 3/1998 | Parker et al. | |
| 5,742,683 A | 4/1998 | Lee et al. | |
| 5,768,132 A | 6/1998 | Cordery et al. | |
| 5,781,438 A | 7/1998 | Lee et al. | |
| 5,781,634 A | 7/1998 | Cordery et al. | |
| 5,793,867 A | 8/1998 | Cordery et al. | |
| 5,796,841 A | 8/1998 | Cordery et al. | |
| 5,801,364 A | 9/1998 | Kara et al. | |
| 5,801,944 A | 9/1998 | Kara | |
| 5,812,990 A | 9/1998 | Ryan, Jr. et al. | |
| 5,812,991 A | 9/1998 | Kara | |
| 5,815,577 A | 9/1998 | Clark | |
| 5,819,240 A | 10/1998 | Kara | |
| 5,822,739 A | 10/1998 | Kara | |
| 5,825,893 A | 10/1998 | Kara | |
| 5,867,578 A | 2/1999 | Brickell et al. | |
| 5,871,288 A | 2/1999 | Ryan, Jr. et al. | |
| 5,917,924 A | 6/1999 | Herbert | |
| 5,918,234 A | 6/1999 | Shah et al. | |
| 5,930,796 A | 7/1999 | Pierce et al. | |
| 5,940,383 A | 8/1999 | Willkie | |
| 5,953,427 A | 9/1999 | Cordery et al. | |
| 5,956,404 A | 9/1999 | Schneier et al. | |
| 5,960,411 A | 9/1999 | Hartman et al. | |
| 5,978,484 A | 11/1999 | Apperson et al. | |
| 5,983,227 A | 11/1999 | Nazem et al. | |
| 5,987,441 A | 11/1999 | Lee et al. | |
| 5,988,897 A | 11/1999 | Pierce et al. | |
| 6,005,945 A * | 12/1999 | Whitehouse | 380/51 |
| 6,010,156 A | 1/2000 | Block | |
| 6,026,385 A | 2/2000 | Harvey et al. | |
| 6,058,384 A | 5/2000 | Pierce et al. | |
| 6,061,671 A | 5/2000 | Baker et al. | |
| 6,064,993 A | 5/2000 | Ryan, Jr. | |
| 6,070,150 A | 5/2000 | Remington et al. | |
| 6,105,063 A | 8/2000 | Hayes, Jr. | |
| 6,134,582 A | 10/2000 | Kennedy | |
| 6,161,139 A | 12/2000 | Win et al. | |
| 6,164,528 A | 12/2000 | Hills et al. | |
| 6,166,729 A | 12/2000 | Acosta et al. | |
| 6,173,209 B1 | 1/2001 | Laval et al. | |
| 6,192,349 B1 | 2/2001 | Husemann et al. | |
| 6,223,166 B1 | 4/2001 | Kay | |
| 6,233,565 B1 * | 5/2001 | Lewis et al. | 705/35 |
| 6,233,568 B1 | 5/2001 | Kara | |
| 6,249,777 B1 | 6/2001 | Kara et al. | |
| 6,275,824 B1 | 8/2001 | O'Flaherty et al. | |
| 6,286,098 B1 | 9/2001 | Wenig et al. | |
| 6,324,523 B1 | 11/2001 | Killeen, Jr. et al. | |
| 6,341,274 B1 | 1/2002 | Leon | |
| 6,367,013 B1 | 4/2002 | Bisbee et al. | |
| 6,381,589 B1 | 4/2002 | Leon | |
| 6,385,654 B1 | 5/2002 | Tanaka | |
| 6,385,731 B2 | 5/2002 | Ananda | |
| 6,408,286 B1 | 6/2002 | Heiden | |
| 6,415,983 B1 | 7/2002 | Ulvr et al. | |
| 6,424,954 B1 | 7/2002 | Leon | |
| 6,427,021 B1 | 7/2002 | Fischer et al. | |
| 6,434,238 B1 * | 8/2002 | Chaum et al. | 380/45 |
| 6,446,204 B1 | 9/2002 | Pang et al. | |
| 6,466,921 B1 * | 10/2002 | Cordery et al. | 705/60 |
| 6,496,932 B1 | 12/2002 | Trieger | |
| 6,505,773 B1 | 1/2003 | Palmer et al. | |
| 6,567,794 B1 | 5/2003 | Cordery et al. | |
| 6,636,983 B1 | 10/2003 | Levi | |
| 6,972,859 B1 | 12/2005 | Patton et al. | |
| 2001/0034716 A1 | 10/2001 | Goodwin | |
| 2001/0037320 A1 | 11/2001 | Allport et al. | |
| 2001/0055388 A1 | 12/2001 | Kaliski, Jr. | |
| 2002/0023057 A1 | 2/2002 | Goodwin et al. | |
| 2002/0046193 A1 | 4/2002 | Bator et al. | |
| 2002/0095383 A1 | 7/2002 | Mengin et al. | |
| 2003/0130954 A1 | 7/2003 | Carr et al. | |

FOREIGN PATENT DOCUMENTS

| | | |
|---|---|---|
| EP | 0 576 113 A2 | 12/1993 |
| EP | 0 604 146 A3 | 6/1994 |
| EP | 0 604 148 A3 | 6/1994 |
| EP | 0 647 925 A2 | 4/1995 |
| EP | 0 604 146 B1 | 11/1997 |
| EP | 0 840 258 A2 | 5/1998 |
| EP | 0 854 448 A2 | 7/1998 |
| EP | 0 892 367 A2 | 1/1999 |
| EP | 0 927 958 A2 | 7/1999 |
| EP | 0 927 963 A2 | 7/1999 |
| EP | 0 948 158 A2 | 10/1999 |
| GB | 2 318 486 A | 4/1998 |
| WO | WO 94/27258 A1 | 11/1994 |
| WO | WO 98/13790 A1 | 4/1998 |
| WO | WO 98/57302 | 12/1998 |
| WO | WO 98/57460 | 12/1998 |
| WO | WO 99/18514 A1 | 4/1999 |
| WO | WO 00/19382 A1 | 4/2000 |
| WO | WO 00/70503 A1 | 11/2000 |

| WO | WO 01/50227 A2 | 7/2001 |

OTHER PUBLICATIONS

The United States Postal Service (USPS) Engineering Center; Information Based Indicia Program (IBIP) Indicium Specification; Jun. 13, 1996; 22pp.

The United States Postal Service (USPS); Information-Based Indicia Program (IBIP); Performance Criteria for Information-Based Indicia and Security Architecture for Closed IBI Postage Metering Systems (PCIBI-C); Jan. 12, 1999; 49pp.

The United States Postal Service (USPS); Information-Based Indicia Program (IBIP); Performance Criteria for Information-Based Indicia and Security Architecture for Open IBI Postage Evidencing Systems (PCIBI-O); Jun. 25, 1999; 76pp.

Tygar, J.D. and Yee, Bennet; Cryptography: It's Not Just For *Electronic* Mail Anymore; School of Computer Science; Mar. 1, 1993; 1-21pp.; Carnegie Mellon University, Pittsburg, PA, USA.

Tygar, J.D. and Yee, Bennet; Dyad: A System for Using Physically Secure Coprocessors; School of Computer Science; May 4, 1991; 1-36pp.; Carnegie Mellon University, Pittsburg, PA, USA.

U.S. Appl. No. 09/585,025 filed Jun. 1, 2000, "Online Value Bearing Item Printing", 125 pp.

U.S. Appl. No. 09/688,451 filed Oct. 16, 2000, Auditing Method and System for an On-Line Value-Bearing Item Printing System, 105pp.

U.S. Appl. No. 09/688,452 filed Oct. 16, 2000, "Role Assignments in a Cryptographic Module for Secure Processing of Value-Bearing Items", 105pp.

U.S. Appl. No. 09/688,456 filed Oct. 16, 2000, "Cryptographic Module for Secure Processing of Value- Bearing Items", 109pp.

U.S. Appl. No. 09/690,066 filed Oct. 16, 2000, "Cryptographic Module for Secure Processing of Value-Bearing Items", 121pp.

U.S. Appl. No. 09/690,083 filed Oct. 16, 2000, "Cryptographic Module for Secure Processing of Value-Bearing Items", 109pp.

U.S. Appl. No. 09/690,243 filed Oct. 17, 2000, "Method and Apparatus for On-Line Value-Bearing Item System", 66pp.

U.S. Appl. No. 09/690,796 filed Oct. 17, 2000, "Secure and Recoverable Database for On-Line Value-Bearing Item System", 71pp.

U.S. Appl. No. 09/692,746 filed Oct. 18, 2000, "Method and Apparatus for Digitally Signing an Advertisement Area Next to a Value-Bearing Item", 61pp.

U.S. Appl. No. 09/692,747 filed Oct. 18, 2000, "Machine Dependent Login For On-Line Value-Bearing Item System", 62pp.

U.S. Appl. No. 09/692,829 filed Oct. 18, 2000, "Postal System Intranet and Commerce Processing for On-Line Value-Bearing System", 179pp.

U.S. Appl. No. 09/788,069 filed Feb. 16, 2001, "On-Line Value-Bearing Indicium Printing Using DSA", 43pp.

Fickel, Louise; "Know Your Customer"; 100 Leaders For the Next Millennium; CIO Magazine; Aug. 15, 1999; 10pp.

Sagner, James S.; "Protecting organizations from electronic-transaction fraud"; Healthcare Financial Management; Feb. 1995; 2pp.

USPS Publications No. 25, "Designing Letter Mail", Aug. 1995, 90pp.

\* cited by examiner

SECURED CENTRALIZED PUBLIC KEY INFRASTRUCTURE

CROSS-REFERENCE TO RELATED APPLICATIONS

This application is a continuation of U.S. patent application Ser. No. 09/690,066, filed Oct. 16, 2000, which claims the benefit of U.S. Provisional Patent Applications Ser. Nos. 60/160,491, filed Oct. 20, 1999 and entitled "SECURE AND RECOVERABLE DATABASE FOR ON-LINE POSTAGE SYSTEM"; 60/160,503, filed Oct. 20, 1999 and entitled "CRYPTOGRAPHIC MODULE ARCHITECTURE"; 60/160,112, filed Oct. 18, 1999 and entitled "INTERNET POSTAL METERING SYSTEM"; 60/160,563, filed Oct. 20, 1999 and entitled "SERVER ARCHITECTURE FOR ON-LINE POSTAGE SYSTEM"; 60/160,041, filed Oct. 18, 1999 and entitled "CRYPTOGRAPHIC MODULE SECURITY APPROACH"; 60/193,057, filed Mar. 29, 2000 and entitled "CUSTOMER GATEWAY DESIGN"; 60/193,055, filed Mar. 29, 2000 and entitled "BROWSER-BASED IBI"; and 60/193,056, filed Mar. 29, 2000 and entitled "MULTI-USER PSD DESIGN" the entire contents of which are hereby expressly incorporated by reference.

FIELD OF THE INVENTION

The present invention relates to secure printing of value-bearing items (VBI) preferably, postage. More specifically, the invention relates to a cryptographic module for secure printing of VBIs.

BACKGROUND OF THE INVENTION

A significant percentage of the United States Postal Service (USPS) revenue is from metered postage. Metered postage is generated by utilizing postage meters that print a special mark, also known as postal indicia, on mail pieces. Generally, printing postage and any VBI can be carried out by using mechanical meters or computer-based systems.

With respect to computer-based postage processing systems, the USPS under the Information-Based Indicia Program (IBIP) has published specifications for IBIP postage meters that identify a special purpose hardware device, known as a Postal Security Device (PSD) that is generally located at a user's site. The PSD, in conjunction with the user's personal computer and printer, functions as the IBIP postage meter. The USPS has published a number of documents describing the PSD specifications, the indicia specifications and other related and relevant information. There are also security standards for printing other types of VBI, such as coupons, tickets, gift certificates, currency, voucher and the like.

A significant drawback of existing hardware-based systems is that a new PSD must be locally provided to each new user, which involves significant cost. Furthermore, if the additional PSD breaks down, service calls must be made to the user location. In light of the drawbacks in hardware-based postage metering systems, a software-based system has been developed that does not require specialized hardware for each user. The software-based system meets the IBIP specifications for a PSD, using a centralized server-based implementation of PSDs utilizing one or more cryptographic modules. The system also includes a database for all users' information. The software-based system, however, has brought about new challenges.

The software-based system should be able to handle secure communications between users and the database. In a hardware-based system, security is generally handled by the local hardware piece, that is unique to each user and includes an encryption processor that encrypts that user's information and communications. However, as mentioned above, this hardware-based system has significant disadvantages.

Therefore, there is a need for a new method and apparatus for implementation of VBI secure printing and a secure IBIP postage meter over a WAN that does not require the special purpose hardware device at the user site. Furthermore, there is a need for a secure system and database that are capable of preventing unauthorized access and tampering.

SUMMARY OF THE INVENTION

In accordance with one aspect of the present invention, an on-line VBI printing system that includes one or more cryptographic modules and a central database has been designed. The cryptographic modules serve the function of the PSDs and are capable of implementing the USPS Information Based Indicia Program Postal Security Device Performance Criteria and the cryptographic security requirements specified by Federal Information Processing Standards (FIPS) 140-1, Security Requirements for Cryptographic Modules, and other required standards. The modules encipher the information stored in the central database for all of the on-line VBI system customers and are capable of preventing access to the database by unauthorized users. Also, a secure communication network is in operation to prevent unauthorized access to the users' data stored in the centralized database. Additionally, the cryptographic module is capable of preventing unauthorized and undetected modification, including the unauthorized modification, substitution, insertion, and deletion of VBI related data and cryptographically critical security parameters.

Each module prevents the unauthorized disclosure of the non-public contents of the VBI data, such as a postage meter, including plaintext cryptographic keys and other critical security parameters. The module also ensures the proper operation of cryptographic security and VBI related meter functions. The module detects errors in the operation of security mechanisms and prevents the compromise of meter data and critical cryptographic security parameters as a result of those errors.

In one aspect the present invention is a method for secure printing of value-bearing items over a computer network comprising the step of; storing information about users in a database remote from the user terminals; securing the information about the users in the database by a plurality of cryptographic devices remote from the user terminals and coupled to the computer network; securing data stored in the database by the plurality of cryptographic devices, wherein each of the plurality of cryptographic devices includes a subsystem for authenticating one or more of the plurality of users; storing a plurality of security device transaction data stored in the database wherein, each transaction data is related to a user; ensuring authenticity and authority of each of the plurality of users; and loading a security device transaction data related to a user into one of the plurality of cryptographic devices when the user requests to operate on a value bearing item.

It is to be understood that the present invention is useful for printing not only postage, but any VBIs, such as coupons, tickets, gift certificates, currency, voucher and the like.

BRIEF DESCRIPTION OF THE DRAWINGS

The objects, advantages and features of this invention will become more apparent from a consideration of the following detailed description and the drawings, in which.

DETAILED DESCRIPTION

Figure 1:
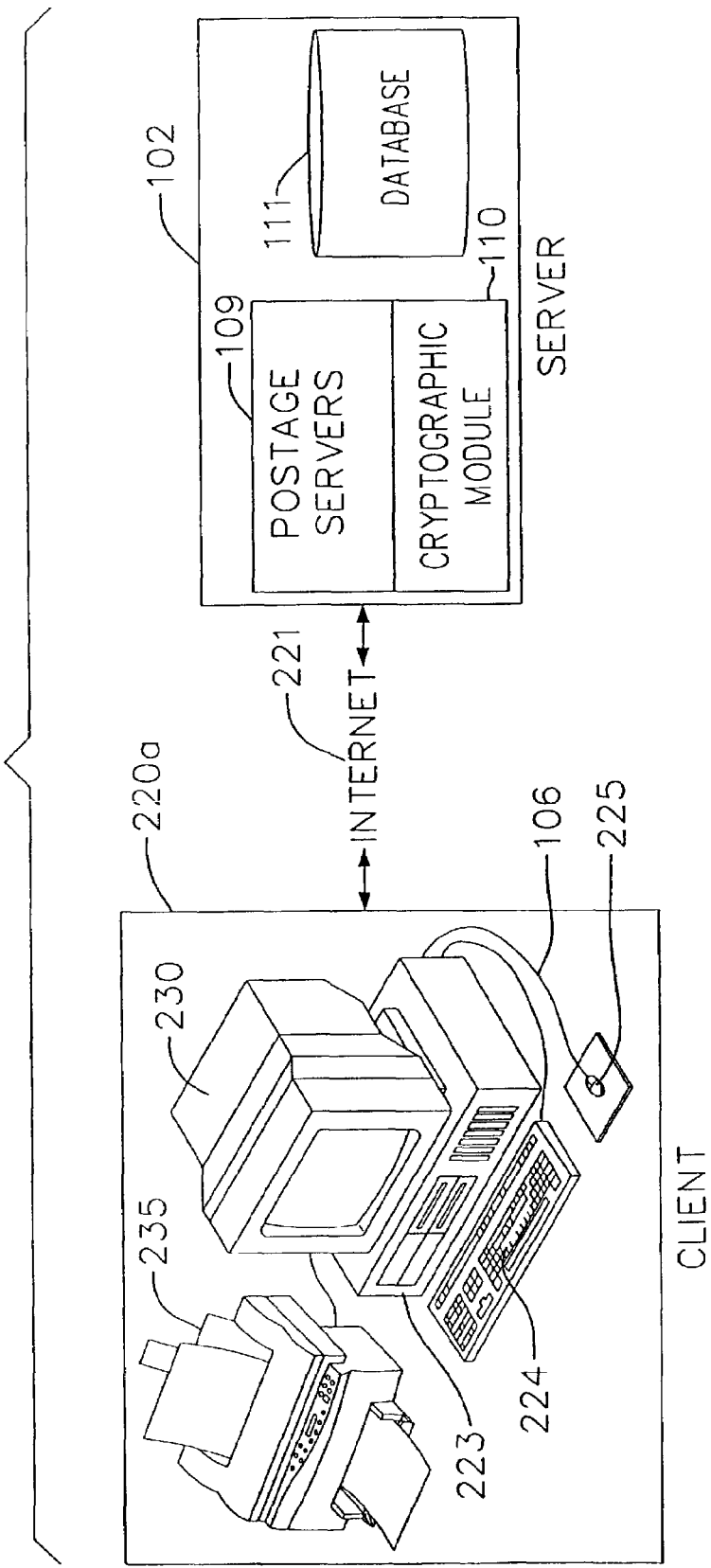
FIG. 1 is an exemplary block diagram for the client/server architecture of one embodiment of the present invention.

In one aspect, the system and method of the present invention prevent unauthorized electronic access to a database subsystem and secure customers' related data, among others. One level of security is achieved by protecting the database subsystem by a postal server subsystem. The postal server subsystem controls preferably, all communications with the database subsystem by executing an authentication algorithm to prevent unauthorized access. Another level of security is achieved by encrypting preferably, all communications between the client system and the postal server subsystem. The encryption-dycryption function is employed using commonly known algorithms, such as, Rivest, Shamir and Adleman ("RSA") public key encryption, DES, Triple-DES, Pseudo-random number generation, and the like algorithms. Additionally, DSA signature, and SHA-1 hashing algorithms may be used to digitally sign a postage indicium.

Another measure of security is the interaction between a cryptographic module and the database subsystem whenever a PSD transaction (security device transaction) is initiated. The cryptographic module and the database subsystem cross-verify the last PSD transaction (security device transaction) before proceeding with the next PSD transaction. If the last transaction record in the cryptographic module and the database subsystem do not match, then the on-line postage system shuts down until the situation can be investigated. This verification process protects against attempts of unauthorized individuals to replace the database subsystem. The registers in the cryptographic modules are cryptographically protected to achieve another level of security.

An exemplary on-line postage system is described in U.S. patent application Ser. No. 09/163,993 filed Sep. 15, 1998, the entire contents of which are hereby incorporated by reference herein. The on-line postage system includes an authentication protocol that operates in conjunction with the USPS requirements. The system utilizes on-line postage system software comprising user code that resides on a client system and controller code that resides on a server system. The on-line postage system allows a user to print a postal indicium at home, at the office, or any other desired place in a secure, convenient, inexpensive and fraud-free manner. The system comprises a user system electronically connected to a server system, which in turn is connected to a USPS system.

Each of the cryptographic modules may be available for use by any user. When a user requests a PSD service, one of the available modules is loaded with data belonging to the user's account and the transaction is performed. When a module is loaded with a user's data, that module becomes the user's PSD. The database record containing each user's PSD data is referred to as the "PSD package" (security device transaction data). After each PSD transaction is completed, the user's PSD package is updated and returned to a database external to the module. The database becomes an extension of the module's memory and stores not only the items specified by the IBIP for storage inside the PSD, but also the user's personal cryptographic keys and other security relevant data items (SRDI) and status information needed for continuous operation. Movement of this sensitive data between the modules and the database is secured to ensure that PSD packages could not be compromised.

In one embodiment, the server system is remotely located in a separate location from the client system. All communications between the client and the server are preferably accomplished via the Internet. FIG. 1 illustrates a remote client system 220a connected to a server system 102 via the Internet 221. The client system includes a processor unit 223, a monitor 230, printer port 106, a mouse 225, a printer 235, and a keyboard 224. Server system 102 includes Postage servers 109, Database 130, and cryptographic modules 110.

An increase in the number of servers within the server system 102 will not negatively impact the performance of the system, since the system design allows for scalability. The Server system 102 is designed in such a way that all of the business transactions are processed in the servers and not in the database. By locating the transaction processing in the servers, increases in the number of transactions can be easily handled by adding additional servers. Also, each transaction processed in the servers is stateless, meaning the application does not remember the specific hardware device the last transaction utilized. Because of this stateless transaction design, multiple servers can be added to each appropriate subsystem in order to handle increased loads.

Furthermore, each cryptographic module is a stateless device, meaning that a PSD package can be passed to any device because the application does not rely upon any information about what occurred with the previous PSD package. Therefore, multiple cryptographic modules can also be added to each appropriate subsystem in order to handle increased loads. A PSD package for each cryptographic module is a database record, stored in the server database, that includes information pertaining to one customer's service that would normally be protected inside a cryptographic module. The PSD package includes all data needed to restore the PSD to its last known state when it is next loaded into a cryptographic module. This includes the items that the IBIP specifications require to be stored inside the PSD, information required to return the PSD to a valid state when the record is reloaded from the database, and data needed for record security and administrative purposes.

In one embodiment, the items included in a PSD package include ascending and descending registers (the ascending register "AR" records the amount of postage that is dispensed or printed on each transaction and the descending register "DR" records the value or amount of postage that may be dispensed and decreases from an original or charged amount as postage is printed.), device ID, indicia key certificate serial number, licensing ZIP code, key token for the indicia signing key, the user secrets, key for encrypting user secrets, data and time of last transaction, the last challenge received from the client, the operational state of the PSD, expiration dates for keys, the passphrase repetition list and the like.

As a result, the need for specific PSDs being attached to specific cryptographic modules is eliminated. A Postal Server subsystem provides cryptographic module management services that allow multiple cryptographic modules to exist and function on one server, so additional cryptographic modules can easily be installed on a server. The Postal Sever subsystem is easy to scale by adding more cryptographic modules and using commonly known Internet load-balancing techniques to route inbound requests to the new cryptographic modules.

Referring back to FIG. 1, Postage servers 109 includes one or more Postal servers and provide indicia creation, account maintenance, and revenue protection functionality for the on-line postage system. The Postage servers 109 include several physical servers in several distinct logical groupings, or services as described below. The individual servers could be located within one facility, or in several facilities, physically separated by great distance but connected by secure communication links.

Cryptographic modules 110 are responsible for creating PSDs and manipulating PSD data to protect sensitive information from disclosure, generating the cryptographic components of the digital indicia, and securely adjusting the user registration. When a user wishes to print VBI, for example, postage or purchase additional VBI or postage value, a user state is instantiated in the PSD implemented within one of the cryptographic modules 110. Database 111 includes all the data accessible on-line for indicia creation, account maintenance, and revenue protection processes. Postage servers 109, Database 130, and cryptographic modules 110 are maintained in a physically secured environment, such as a vault.

Figure 2:
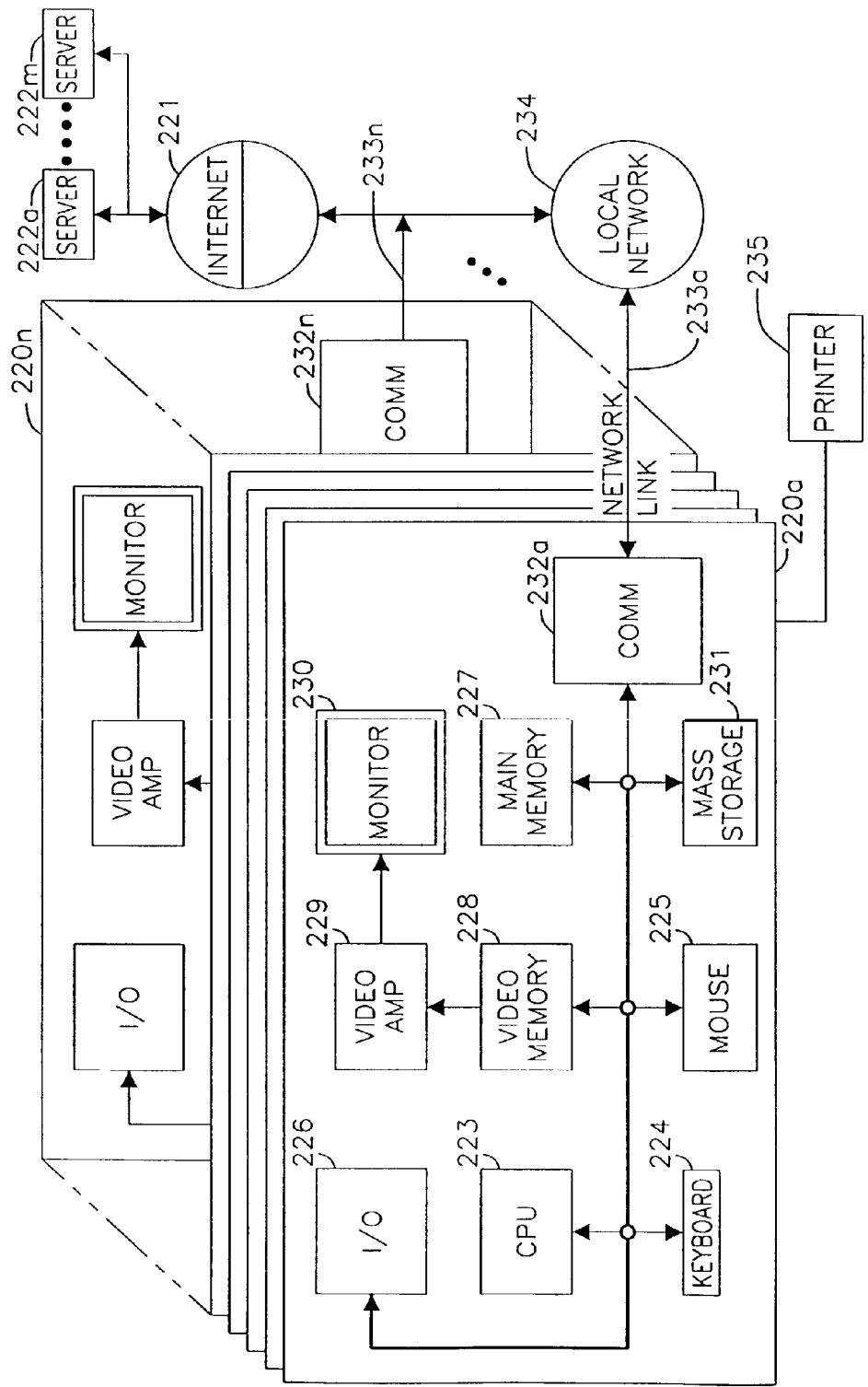
FIG. 2 is an exemplary block diagram of a remote user computer connected to a server via Internet according to one embodiment of the present invention.

FIG. 2 shows a simplified system block diagram of a typical Internet client/server environment used by an on-line postage system in one embodiment of the present invention. PCs 220a-220n used by the postage purchasers are connected to the Internet 221 through the communication links 233a-233n. Each PC has access to one or more printers 235. Optionally, as is well understood in the art, a local network 234 may serve as the connection between some of the PCs, such as the PC 220a and the Internet 221 or other connections. Servers 222a-222m are also connected to the Internet 221 through respective communication links. Servers 222a-222m include information and databases accessible by PCs 220a-222n. The on-line VBI system of the present invention resides on one or more of Servers 222a-222m.

In this embodiment, each client system 220a-220m includes a CPU 223, a keyboard 224, a mouse 225, a mass storage device 231, main computer memory 227, video memory 228, a communication interface 232a, and an input/output device 226 coupled and interacting via a communication bus. The data and images to be displayed on the monitor 230 are transferred first from the video memory 228 to the video amplifier 229 and then to the monitor 230. The communication interface 232a communicates with the servers 222a-222m via a network link 233a. The network link connects the client system to a local network 234. The local network 234 communicates with the Internet 221.

In one embodiment, a customer, preferably licensed by the USPS and registered with an IBIP vendor (such as Stamps.com), sends a request for authorization to print a desired amount of VBI, such as postage. The server system verifies that the user's account holds sufficient funds to cover the requested amount of postage, and if so, grants the request. The server then sends a cryptographically authenticated response specifying the VBI to the client system. The client system then sends image information for printing of a postal indicium for the granted amount to a printer so that the postal indicium is printed on an envelope or label.

In one embodiment, when a client system sends a VBI print request to the server system, the request needs to be authenticated before the client system is allowed to print the VBI, and while the VBI is being printed. The request is cryptographically authenticated using an authentication code. The client system sends a password (or passphrase) entered by a user to the server for verification. If the password fails, a preferably asynchronous dynamic password verification method terminates the session and printing of the VBI aborted. Also, the server system communicates with a system located at a certification authority for verification and authentication purposes.

In one embodiment, the information processing components of the on-line postage system include a client system, a postage server system located in a highly secure facility, a USPS system and the Internet as the communication medium among those systems. The information processing equipment communicates over a secured communication line.

Preferably, the security and authenticity of the information communicated among the systems are accomplished on a software level through the built-in features of a Secured Socket Layer (SSL) Internet communication protocol. An encryption hardware module embedded in the server system is also used to secure information as it is processed by the secure system and to ensure authenticity and legitimacy of requests made and granted.

The on-line VBI system does not require any special purpose hardware for the client system. The client system is implemented in the form of software that can be executed on a user computer (client system) allowing the user computer to function as a virtual VBI meter. The software can only be executed for the purpose of printing the VBI indicia when the user computer is in communication with a server computer located, for example, at a VBI meter vendor's facility (server system). The server system is capable of communicating with one or more client systems simultaneously.

In one embodiment of the present invention, the cryptographic modules 110 are FIPS 140-1 certified hardware cards that include firmware to implement PSD functionality in a cryptographically secure way. The cryptographic modules are inserted into any of the servers in the Postal Server Infrastructure. The cryptographic modules are responsible for creating PSDs and manipulating PSD data to generate and verify digitally signed indicia. Since the PSD data is created and signed by a private key known only to the module, the PSD data may be stored externally to the cryptographic modules without compromising security.

Figure 3:
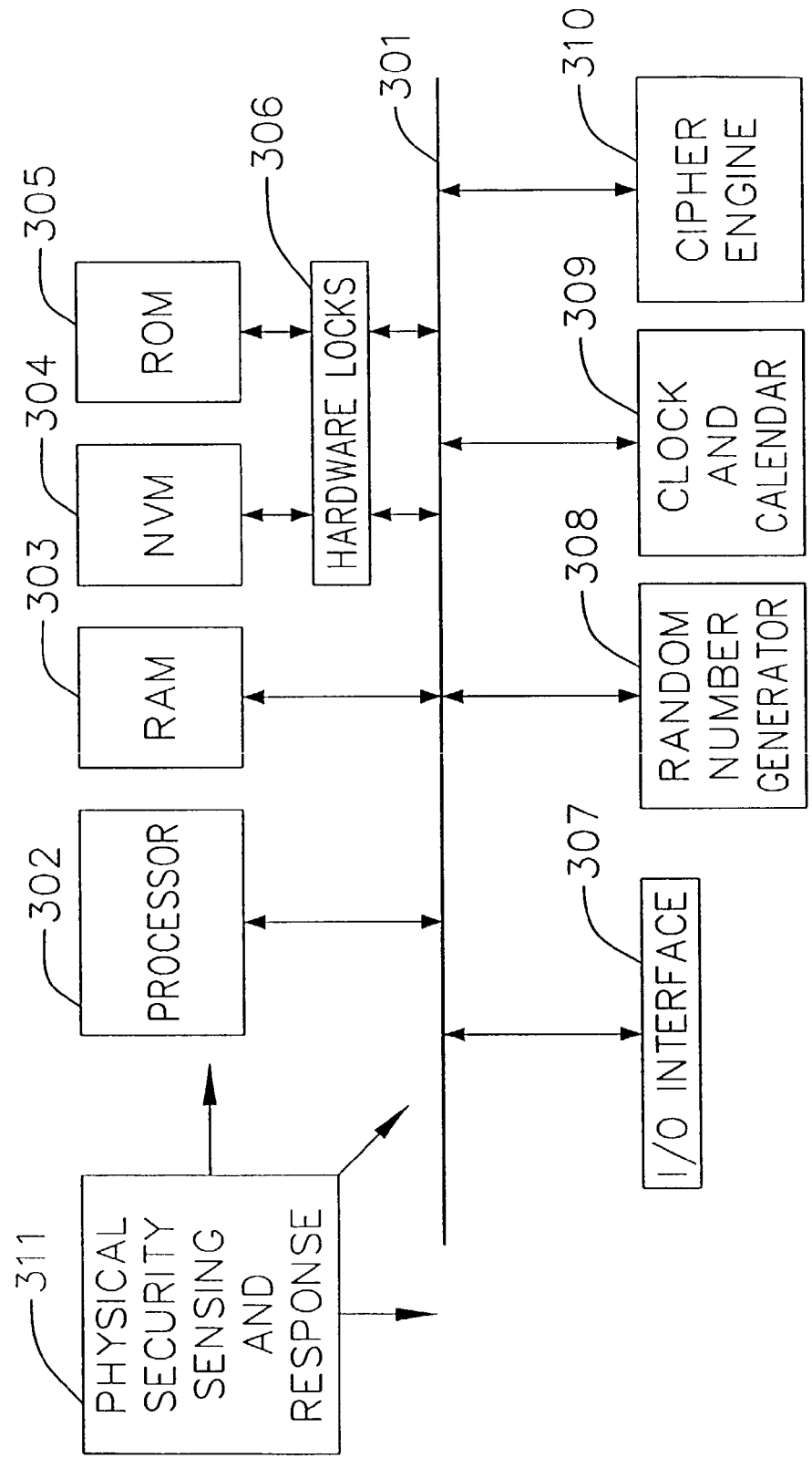
FIG. 3 is an exemplary block diagram of a cryptographic device according to one embodiment of the present invention.

FIG. 3 is a block diagram of an exemplary cryptographic module. Processor 302 is electrically coupled to the RAM 303, NVM 304, ROM 305. I/O interface 307, Random Number Generator (RNG) 308, Cipher Engine 310, and Clock 309 through the bus 301. NVM 304 and ROM 305 are protected from unauthorized access by the Hardware Locks control 306. A Security sensing & Response (SSR) circuit 311 detects any attempts to tamper with the module and acts accordingly. The SSR circuit includes sensors to protect against attacks involving probe penetration, power sequencing, radiation, temperature manipulation, and the like, consistent with some security standards, such as FIPS 140-1 Level 3 and 4 requirements. If the tamper sensors are triggered, the cipher Engine 310 resets its critical keys, destroys its certification, and is rendered inoperable.

Initially, the module generates a unique key pair, which is stored in the secured NVM. The tamper detection circuitry is activated at this time and remains active throughout the useful life of the module, protecting this private key, as well as all other keys and sensitive data. The module's private key is certified by a private key and the certificate is retained in the module. Subsequently, the module' private key is used to sign module status responses which, in conjunction with a series of public key certificates, demonstrates that the module remains intact and is genuine. As a result, only the software that has been signed by an entity trusted by the module (via the embedded public key) will be loaded.

Cipher Engine 310 supports multiple custom cryptographic engines and other accelerated state machines to provide complex and numerically intensive operations required for encryption/decryption, authentication, and key management. RNG 308 generates the required data for the Cipher Engine. Clock & Calender circuit 309 generates real-time clock and calender for the Cipher Engine and the I/O interface 307 provides interface to other devices on a computer network.

In one embodiment, Cipher Engine 310 includes the following logical elements:

A DES Engine including the following features:
   DES, Triple DES, MAC and Triple-DES MAC functions
   Electronic codebook (ECB) support and cipher block chain (CBC) modes of operation
   3 internal 64-bit key registers loaded from a ISA port
   64-bit initial vector register loadable from a ISA port
   64-bit input & output registers readable from both a 16-bit ISA port or a 32-bit PCI add-on port via the output FIFO
   Optional DES assist for data padding of data blocks which are not multiples of 64-bytes A SHA Engine including the following features:
   SHA-1 secure hash algorithm
   Four 32-bit K registers with fast initialization to FIPS-180 Constants via an ISA port accessible control register
   Five 32-bit H registers with fast initialization to FIPS-180 initial values by an ISA port accessible control register. Hashing data loadable into H registers via the 16-bit ISA port or the 32-bit PCI add-on port and input FIFO. Hash results readable from five 32-bit H registers via ISA port.
   Five internal registers for SHA-1 hash results creation
   SHA engine exercises FIPS 180-1 algorithm. Digital Signature Standard FIPS PUB-186 pseudo random number creation possible by programming K constants and H initialization vector registers via the ISA bus input.

A RSA Engine capable of performing the following modular arithmetic and exponentiation functions for high speed RSA encryption:

| | |
|---|---|
| Modular Exponentiation With CRT (chinese remainder theorem) | $R = A^{(B_p,\ B_q)} \bmod (N_p, N_q)$ |
| Modular exponentiation | $R = A^B \bmod N$ |
| Modular multiplication | $R = (A*B) \bmod N$ |
| Modular addition | $R = (A + B) \bmod N$ |
| Addition | $R = (A + B)$ |
| Subtraction | $R = (A - B)$ |
| 2's complement | $R = \sim A + 1$ |
| Signature | $R = A^B \bmod N$; if $(2R >= N)\ R = N - R$ |
| Verify | $R = A^b \bmod N$; if $(R \bmod 16\ != 6)\ R = N - R$ |

The RSA engine is a 2048-bit engine with the following registers:

| Operand Register | Length (bits) | Contents |
|---|---|---|
| A | 2048 | Data |
| B | 2048 | Exponent |
| $B_p$ | 1088 | CRT Mod Expo. only |
| $B_q$ | 1024 | CRT Mod Expo. only |
| N | 2048 | Module |
| $N_q$ | 1088 | CRT Mod Expo. only |
| $N_p$ | 1024 | CRT Mod Expo. only |
| U | 1088 (CRT only) | Multiplicative inverse for CRT |
| R | 2048 | Results |

Registers $B_1\ B_{p1}\ B_{q1}\ N_1\ N_{p1}\ N_q$ and U are write only from the ISA port of the UltraCypher module.
Register R (results) is read only from the ISA port of the UltraCypher module
Chinese Remainder (CRT) Operands
A = data
$B_p$ = the largest of two odd primes so $N = N_p * N_q$
$B_q$ = the smallest of two odd primes so $N = N_p * N_q$
$N_p = B \bmod (N_p - 1)$
$N_q = B \bmod (N_q - 1)$
U = Multiplicative inverse: $N_q^{-1} \bmod N_p$ Exponentiation performance can be enhanced by enabling the built-in Chinese Remainder Theorem (CRT) algorithm.

In this embodiment, there are ten 16-bit Control, Setup, and Status registers which are written and read via the ISA bus. Some are read only and some are write only from outside of the module. These registers control the data paths and various engines inside of the module and provide information as to the status of the engines and FIFO's.

A 64-bit shift register is provided for the collecting of Random data bits generated from outside the module. The external 1-bit input (usually a random noise source) is sampled and loaded into bit-0 of the shift register. The sampling rate is controlled from control register bits which are loaded via the ISA bus. The collected data bits are shifted after each new sampling of data. When the shift register is full of new data an interrupt is generated and the shift register contents may be read from the ISA data port.

A 128×32-bit Input FIFO and a similar Output FIFO is provided in the module to buffer a PCI Add-on bus.

| INPUT FIFO Inputs | INPUT FIFO Outputs | OUTPUT FIFO Inputs | OUTPUT FIFO Outputs |
|---|---|---|---|
| PCI add-on bus ISA bus | DES engine SHA-1 engine OUTPUT FIFO ISA bus | DES engine ISA bus INPUT FIFO | PCI add-on bus ISA bus |

A multipurpose 16-bit data interface supports an ISA 16-bit cycles. Addressing of the module's internal registers is via the ISA address bus. The PCI Add-on bus is capable of supporting PCI bus master. There are also 8 IRQ interrupt outputs, reset, other control lines, clock I/O.

The cryptographic module of the present invention may be embodied in a single-chip module, a multi-chip embedded module, a multi-chip standalone module, embedded in software running on a computer such as a personal computer, or the like.

The on-line VBI system is based on a client/server architecture. Generally, in a system based on client/server architecture the server system delivers information to the client system. That is, the client system requests the services of a generally larger computer. In one embodiment, the client is a local personal computer and the server is a more powerful group of computers that house the information. The connection from the client to the server is made via a Local Area Network, a phone line or a TCP/IP based WAN on the Internet. A primary reason to set up a client/server network is to allow many clients access to the same applications and files stored on the server system.

In one embodiment, Postage servers 109 include a string of servers connected to the Internet, for example, through a T1 line, protected by a firewall. The firewall permits a client to communicate with a server system, only if the information packet transmitted by the client system complies with a security policy set by the server system. The firewall not only protects the system from unauthorized users on the Internet, it also separates the Public Network (PUBNET) from the Private Network (PRVNET). This ensures that packets from the Internet will not go to any location but the PUBNET. The string of servers form the different subsystems of the on-line postal system. The services provided by the different subsystems of the on-line postage system are designed to allow flexibility and expansion and reduce specific hardware dependency.

Figure 4:
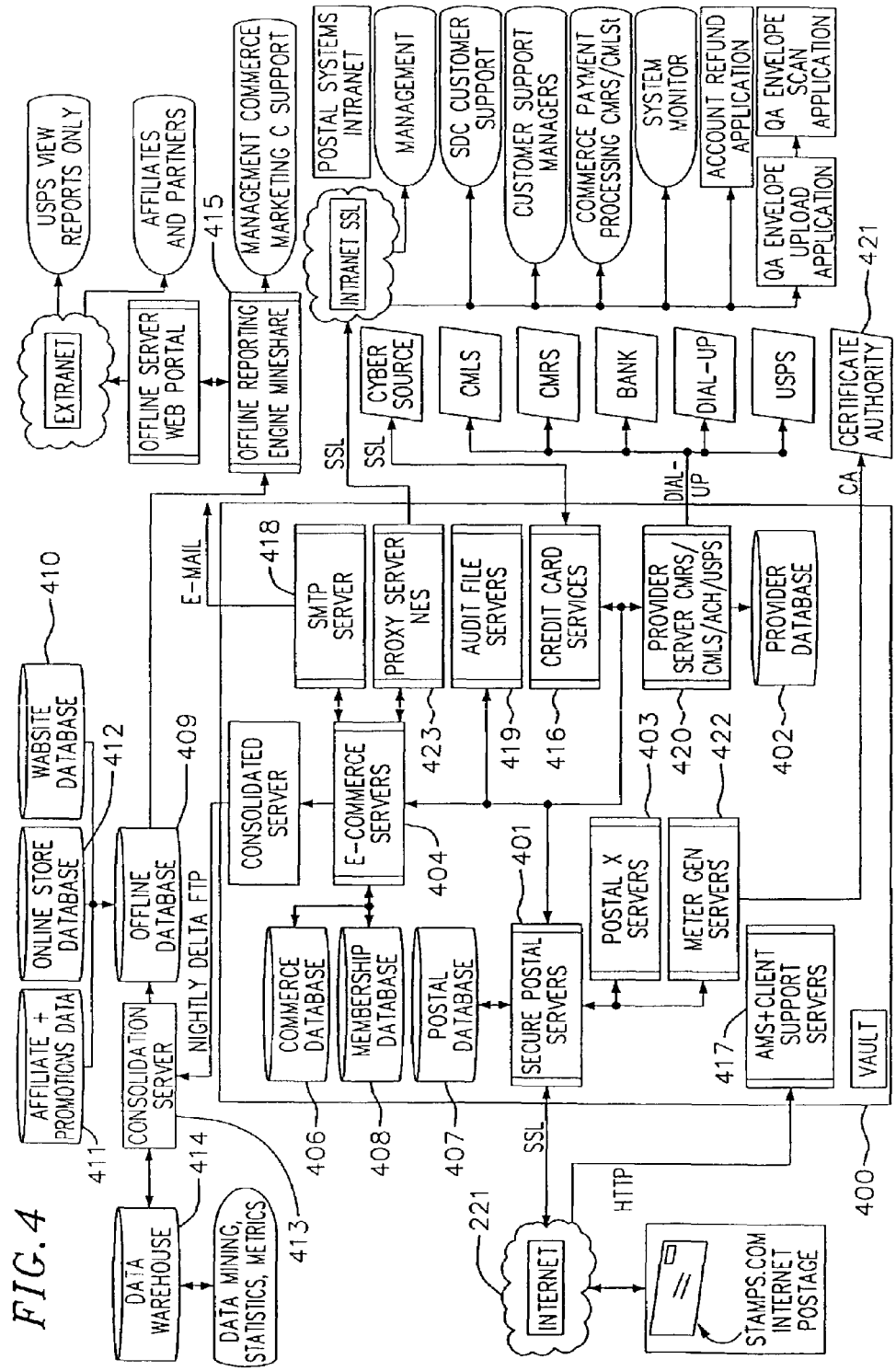
FIG. 4 is an exemplary block diagram of servers, databases, and services according to one embodiment of the present invention.

The Database subsystem is comprised of multiple databases. FIG. 4 illustrates an overview of the on-line VBI system which includes the database subsystems. Database 411 includes the Affiliate DBMS and the Source IDs DBMS. The Affiliate DBMS manages affiliate information (e.g., affiliate's name, phone number, and affiliate's Website information) that is stored on the Affiliate Database. Using the data from this database, marketing and business reports are generated. The Source IDs Database contains information about the incoming links to the vendor's Website (e.g., partners' information, what services the vendor offers, what marketing program is associated with the incoming links, and co-branding information). Using the data from this database, marketing and business reports are generated.

The Online Store Database 412 contains commerce product information, working orders, billing information, password reset table, and other marketing related information. Website database 410 keeps track of user accesses to the vendor website. This database keeps track of user who access the vendor website, users who are downloading information and programs, and the links from which users access the vendor website. After storing these data on the Website Database 410, software tools are used to generate the following information:

Web Site Status
Web Site Reports
Form Results
Download Successes
Signup, Downloads, and Demographic Graphs
Web Server Statistics (Analog)
Web Server Statistics (Web Analyzer)

Offline database 409 manages the VBI (e.g., postal) data except meter information, postal transactions data, financial transactions data (e.g., credit card purchases, free postage issued, bill credits, and bill debits), customer marketing information, commerce product information, meter license information, meter resets, meter history, and meter movement information. Consolidation Server 413 acts as a repository for data, centralizing data for easy transportation outside the vault 400. The Consolidation Server hosts both file and database services, allowing both dumps of activity logs and reports as well as a consolidation point for all database data.

The Offline Reporting Engine MineShare Server 415 performs extraction transformation from the holding database that received transaction data from the Consolidated Database (Commerce database 406, Membership database 408, and Postal Database 407). Also, the Offline Reporting Engine MineShare Server handles some administrative tasks. Transaction data in the holding database contains the transaction information about meter licensing information, meter reset information, postage purchase transactions, and credit card transactions. After performing extraction transformation, business logic data are stored on Offline Database 409. Transaction reports are generated using the data on the Offline Database. Transaction reports contain marketing and business information.

The Data Warehouse database 414 includes all customer information, financial transactions, and aggregated information for marketing queries (e.g., how many customers have purchased postage). In one embodiment, commerce Database 406 includes a Payment Database, an E-mail Database, and a Stamp Mart Database. The E-mail DBMS manages access to the contents of e-mail that were sent out to everyone by vendor servers. The Stamp Mart database handles order form processing. The E-commerce Server 404 provides e-commerce related services on a user/group permission basis. It provides commerce-related services such as payment processing, pricing plan support and billing as well as customer care functionality and LDAP membership personalization services.

A Credit Card Service is invoked by the E-commerce Server 404 to authorize and capture funds from the customer's credit card account and to transfer them to the vendor's merchant bank. A Billing Service is used to provide bills through e-mail to customers based on selected billing plans An ACH service runs automatically at a configurable time. It retrieves all pending ACH requests and batches them to be sent to bank for postage purchases (i.e. money destined for the USPS), or Chase for fee payments which is destined for the vendor account.

The E-commerce DBMS 406 manages access to the vendor specific Payment, Credit Card, and Email Databases. A Membership DBMS manages access to the LDAP membership directory database 408 that hosts specific customer information and customer membership data. A Postal DBMS manages access to the Postal Database 407 where USPS specific data such as meter and licensing information are stored. A Postal Server 401 provides secure services to the Client, including client authentication, postage purchase, and indicia generation. The Postal Server requires cryptographic modules to perform all functions that involve client authentication, postage purchase, and indicia generation.

Postal Transaction Server 403 provides business logic for postal functions such as device authorization and postage purchase/register manipulation. The Postal Transaction Server requires the cryptographic modules to perform all functions. There are four Client Support Servers. Address Matching Server (AMS) 417 verifies the correct address specified by a user. When the user enters a delivery address or a return address using the Client Software, the user does not need the address matching database on the user's local machine to verify the accuracy of the address. The Client software connects to the vendor's server and uses the central address database obtained from the USPS to verify the accuracy of the address. If the address is incorrect, the client software provides the user with a prioritized list of addresses to match the correct address. These choices are ranked in a user definable order. This information is represented using a plain text format.

The Client Support Servers 417 provides the following services: a Pricing Plan service, an Auto Update service, and a Printer Config service. The Pricing Plan Service provides information on pricing plans and payment methods available to the user. It also provides what credit cards are supported and whether ACH is supported. This information is represented preferably using a plain text format. The Auto Update Service verifies whether the user is running the latest Client Software. If there is newer Client Software, the Auto Update Server downloads the new patches to the user computer. The Client Support Database has tables for the client software update information. This information is represented using a plain text format.

Before the user tries to print postage, the user sends his or her printer driver information over the Internet in plain text. The Printer Config Service looks up the printer driver information in the Printer Driver Database to determine whether the printer driver is supported or not. When the user tries to configure the printer, the user prints a test envelope to test whether the postage printing is working properly or not. This testing envelope information is sent over the Internet in plain text and is stored in the Client Support Database.

MeterGen server 422 makes calls into the cryptographic module to create sufficient meters to ensure that the vendor can meet customer acquisition demands. SMTP Server 418 communicates with other SMTP servers, and it is used to forward e-mail to users. Gatekeeper Server works as a proxy server by handling the security and authentication validation for the smart card users to access customer and administration information that reside in the vault.

The Proxy Server 423 uses the Netscape™ Enterprise SSL library to provide a secure connection to the vault 400. Audit File Server 419 acts as a repository for module transaction logs. The Audit logs are cryptographically protected. The Audit File Server verifies the audit logs that are digitally signed. The audit logs are verified in real time as they are being created. Postal Server writes audit logs to a shared hard drive on the Audit File Server. After these logs are verified, the Audit File Server preferably moves them from the shared hard drive to a storage device that is not shared by any of the vendor servers.

Provider Server provides reporting and external communication functionality including the following services. CMLS Service forwards license applications and it processes responses from CMLS. The CMLS Service uses cryptographic functions provided by the Stamps.com Crypt library to decrypt the user's SSN/Tax ID/Employee ID. CMRS Service reports meter movement and resetting to the USPS Computerized Meter Resetting infrastructure. ACH Service is responsible for submitting ACH postage purchase requests to the USPS lockbox account at the bank. The CMLS Service uses cryptographic functions to decrypt the user's ACH account number.

After decrypting ACH account information, the ACH is encrypted using the vendor's script library. Then, the encrypted ACH file is e-mailed to the Commerce Group by the SMTP server. When the Commerce Group receives this encrypted e-mail, the vendor's Decrypt utility application is used to decrypt the ACH e-mail. After verifying the ACH information, the Commerce Group sends the ACH information through an encrypted device first and then uses a modem to upload the ACH information to a proper bank. The Certificate Authority issues certificates for all IBIP meters. The certificates are basically used to provide authentication for indicia produced by their respective meters.

The following are exemplary steps describing the certificate authorization process:

MeterGen asks the module to create a meter package,

The module returns a package and the meter's public key,

MeterGen creates a certificate request with the public key, signs the request with a USPS-issued smartcard, and submits the request to the USPS Certificate Authority, The Certificate Authority verifies the request came from the vendor then, it creates a new certificate and returns it to MeterGen, MeterGen verifies the certificate using the USPS Certificate Authority's certificate (e.g., to ensure it wasn't forged) and stores the certificate information in the package. The package is now ready to be associated with a customer.

The Postal Server subsystem 401 controls client and remote administration access to server functionality, authenticates clients and allows clients to establish a secure connection to the on-line postage system. The Postal Server subsystem also manages access to USPS specific data such as PSD information and a user's license information. The Postal Server subsystem queries the Postal portion of the Database subsystem for the necessary information to complete the task. The query travels through the firewall to the Postal portion of the Database subsystem. The Postal Server subsystem is the subsystem in the Public Network that has access to the Database subsystem.

In one embodiment of the present invention, Postal Server 401 is a standalone server process that provides secure connections to both the clients and the server administration utilities, providing both client authentication and connection management functionality to the system. Postal Server 401 also houses postal-specific services that require high levels of security, such as purchasing postage or printing indicia. Postal Server 401 is comprised of at least one server, and the number of servers increases when more clients need to be authenticated, are purchasing postage or are printing postage indicia.

The growth in the number of servers of the Postal Server will not impact the performance of the system since the system design allows for scalability. The Postal Server is designed in such a way that all of the business logic is processed in the servers and not in the database. By locating the transaction processing in the servers, increases in the number of transactions can be easily handled by adding additional servers. Also, since each transaction is stateless (the application does not remember the specific hardware device the last transaction utilized), multiple machines can be added to each subsystem in order to handle increased loads. In one embodiment, load balancing hardware and software techniques are used to distribute traffic among the multiple servers.

Typically, the security requirements of an online VBI system entail protections of two basic types: Logical and Physical, or both. Logical protections employ cryptographic techniques involving encryption algorithms and authentication processes. Physical security measures are required to prevent undetected tamper and to protect stored critical data from unauthorized access, modification or destruction. The PSD functionality and data are to be protected by the cryptographic modules.

For the embodiment that includes printing postage, system functional requirements are based on the IBIP specifications. The PSD is preferably located at a central location (for example, the Internet server) and may service multiple clients. The PSD's functions include client authorization (assignment of a "meter" to a client), postage register arithmetic operations, creation and printing of a valid postage, messages between the provider infrastructure and PSD, and the like.

The following functional security objectives are achieved by the cryptographic module according to one aspect of the present invention:
  preventing unauthorized and undetected modification of data, including the unauthorized modification, substitution, insertion, and deletion of postage related data and cryptographically critical security parameters;
  preventing the unauthorized disclosure of the non-public contents of the postage meter, including plaintext cryptographic keys and other critical security parameters;
  ensuring the proper operation of cryptographic security and postage related meter functions;
  detecting errors in the operation of security mechanisms and to prevent the compromise of meter data and critical cryptographic security parameters as a result of those errors;
  providing indications of the operational state of the postage meter; and
  employing generally accepted security methods for the protection of the meter and cryptographic module, and their contents.

The cryptographic module is capable of supporting authorized roles and the corresponding services that can be performed within those roles. Since the module can support multiple concurrent operators, the module internally maintains the separation of the roles and services performed by each operator. Furthermore, a cryptographic module is used to employ access control mechanisms to authenticate an operator accessing the module (either directly or indirectly via a computer process acting on his or her behalf) and to verify that the operator is authorized to assume the desired role and to perform the desired services within that role.

In one embodiment, the roles supported by the module includes the following roles:
  Security Officer role initiates key management functions, including import, export, activation and de-activation of keys.
  Key Custodian role takes possession of (encrypted) shares of keys during key export and enter them during key import.
  Administrator role manages the user access control database.
  Auditor role manages (views, saves, archives, and deletes) audit logs.
  Provider role transmits signed messages to the PSD's for postage refilling and other provider functions.
  User role performs the expected IBIP postal meter operations.
  Certificate Authority role allows the PSD's public key certificate to be loaded and verified.

Access to the first four of the above listed roles is preferably obtained by logging on from a computer connected to the cryptographic module. Software applications on the computer and in the module first establish a secure communications channel (a session). A session master key is established using a NIST approved protocol, for example, anonymous unauthenticated Diffe-Hellman key exchange. The Diffe-Hellman system parameters, p and q, are embedded in the software of the module and the associated computer. Because the Diffe-Hellman protocol is vulnerable to certain attacks, preferably, the computer and the module are isolated from the LAN whenever a secure session is required. The master key is then used to derive transaction keys (for MACing and encrypting) that are changed after each message is transmitted.

Once the secure session with the module is established, the entities logging on can input their names and passphrases to provide identity based authentication for the selected role. During the initializing state of the module, access control data for the entity that will assume the administrator role is entered in a module access control database. This allows the administrator to log on and enter access control data for all other entities who will require access to the module.

The confidentiality requirement in FIPS 140-1 mandates encryption of all sensitive security parameters, including passwords. The cryptographic module of the present invention establishes the session and its security services first, and then transmits the password over the encrypted (and authenticated) channel.

The user passphrase as typed on the keyboard is hashed by the host machine and the module only has knowledge of the hash value. In the remainder of this document, the hashed passphrase as used to get access to the module is called the password.

Preferably, there is no operational requirement to have more than one user logged on at the same time, or to have users with more than one role. This is desirable because of separation of duties. In one embodiment, for each action that is requested, the access control makes it clear which user requested it, and what his role(s) is (are). This holds irrespective of whether the request is granted or denied. This would be difficult to achieve if more than one user is logged on at the same time.

Certain roles have disjoint sets of authorized commands. For example, an Auditor is not authorized to perform any operational or key management related commands. While it is possible to check that a user does not possess certain roles are well as verifying that he does possess another role (e.g., verify that the user is not an Administrator, and is a Security Officer), this would complicate the code and the design. A more elegant and foolproof method is to disallow users to hold multiple roles. If one physical user ever has to have more than one role, an easy solution is to provide multiple accounts for this user, one account for each role.

In one embodiment, for each user, the following user profile data is maintained inside the module, in permanent storage:
  Username (User ID, UID)
  User Role (Role ID, RID)
  Password (hashed passphrase)
  Logon failure count
  Logon failure limit
  Logon time-out limit
  Account expiration
  Password expiration
  Password period (the period for which password validity is granted when changing it).

The following functions are provided for access management:
  Initialization of the access control database.
  Begin Admin (transition to Administrative state).
  End Admin (transition back to Operational state).
  Creation of an account.

Deletion of an account.

Modification of an account.

Viewing the access control database. This command lists all users and their roles, account expiration, last access, but (of course) not the user passwords.

Logon.

Logoff.

Query Current User Role.

Query Current User ID.

Change password.

Set the internal module clock.

Get Status.

The initialization of the access control database creates the minimal set of users required by the module. This set includes one Administrator, one Security Officer and at least two Key Custodians. This command is the first command in Initializing state, as all other commands require one of these users. Creation, deletion and modification of an account and access control database and setting the internal module clock are restricted to users with Administrator role, in Administrative state only. Administrative state is entered by the Start Admin command, issued by a Security Officer in Operational state.

All sensitive Administrative commands are collected in Administrative state and require Administrator user role. This separation of roles ensures dual control. Secondly, the transition to Administrative state will ensure that no operational commands can be issued by the Administrator (separation of duties). Finally, Administrative state can only be reached from Operational state, ensuring that initialization of the module has been completed successfully before any administrative command can be issued. The End Admin command causes the module to transition back to Operational state.

Preferably, the cryptographic module only allows one session to be established at a time. After authenticating to select a role, the entity can then issue any command that is available to that role. Preferably, meter users are authenticated on a command-by-command basis. During the user registration process, a DES MAC key, generated by the client cryptographic software, is transmitted to the module and is stored in the client's PSD package. Each command from a user that requests PSD services is DES MAC'ed with his personal DES MAC key which allows the module to authenticate the user. Many clients can be simultaneously connected to the transaction server and the module(s) will respond to their requests for service as each request is received from a client.

The provider is authenticated on a command-by-command basis. Provider messages are signed using DSA. The signature is verified using the public key which is loaded into the module when it is initialized for postal operation. The certificate authority role is authenticated by using the Certificate Authority ("CA") certificate to verify the signature on the PSD's public key certificate. In one embodiment, the module implements identity based authentication for all roles which meets the requirements of FIPS 140-1, level 3, in the area of roles and services.

In one embodiment of the present invention, the cryptographic module is implemented within an IBM 4758 cryptographic Coprocessor to securely print VBIS. The IBM 4758 to provides a set of cryptographic hardware and software within a protective enclosure that could be customized through additional software development. The IBM 4758 specification is described in "Building a High-Performance, Programmable Secure Coprocessor," S. W. Smith and S. Weingart, IBM T. J. Watson Research Center, Feb. 17, 1998; and "IBM 4758 Cryptographic Coprocessor Specification," available on IBM's website (www.IBM.com), the contents of which are hereby incorporated by reference herein.

The module's software is divided into four separately controlled layers. Software layers zero and one allow the module to initialize itself after power up, run self-tests, and include functions to cryptographically authenticate software loaded into layers two and three. The 4758 module, including the software of layer zero and one, has received a Security Level 4 certificate from NIST. In this embodiment, the present invention is implemented by developing a new and proprietary crypto service and postal application software for installation in layer three.

FIPS 140-1 cryptographic security requirements are graded into four levels of increasing security and assurance. At the transaction server, SSL cryptographic functions may be implemented with software at security level 1, or may employ a cryptographic module to achieve a greater level of security. For the cryptographic module of the present invention, security level 3 requirements are specified for each of the applicable FIPS 140-1 security areas, except Physical Security, which is specified as level 4. The following are brief descriptions of level 3 and level 4 security principles.

Level 3 provides for identity-based authentication, which is stronger than the role-based authentication used in level 2. The module need to authenticate the identity of an operator and verify that the identified operator is authorized to assume a specific role and perform a corresponding set of services.

Level 3 also provides stronger requirements for entering and outputting critical security parameters. The data ports used for critical security parameters need to be physically separated or logically distinct from other data ports. Furthermore, the parameters need to either be entered into or output from the module in encrypted form, in which case they may travel through enclosing or intervening systems, or be directly entered into or output from the module (without passing through enclosing or intervening systems) using split knowledge procedures.

Level 3 allows software cryptography in multi-user, time-shared systems when a trusted operating system is employed along with a trusted path for the entry and output of critical security parameters. A trusted operating system with a trusted path would have the capability to protect cryptographic software and critical security parameters from other untrusted software that may run on the system. Such a system could prevent plaintext from being mixed with ciphertext, and it could prevent the unintentional transmission of plaintext keys.

Security level 4 provides the highest level of security. Level 4 physical security provides an envelope of protection around the cryptographic module. Whereas, the tamper detection circuits of lower level modules may be bypassed, the intent of level 4 protection is to detect a penetration of the device from any direction. For example, if one attempts to cut through the enclosure of the cryptographic module, the attempt is detected and all critical security parameters are preferably zeroized. Level 4 devices are particularly useful for operation in a physically unprotected environment where an intruder could possibly tamper with the device.

Level 4 also protects a module against a compromise of its security due to environmental conditions or fluctuations outside of the module's normal operating ranges for voltage and temperature. Intentional excursions beyond the normal operating ranges could be used to thwart a module's defense during an attack. A module is required to either include special environmental protection features designed to detect fluctuations or to undergo rigorous environmental failure testing that provides a reasonable assurance that the module will not be affected by fluctuations outside of the normal operating range in a manner that can compromise the security of the module.

The cryptographic modules are capable of being used in a multi-node server based environment. When the transaction server receives a request that requires module services, it gathers all data required to perform the service and inputs it to a module as part of a module command. Depending on the service requested, the module may generate outputs such as a message to the provider infrastructure, a message to the client, or an updated PSD package to be stored by the database server. The transaction server acts on these module outputs to continue the transaction sequence by relaying messages to the provider, the client, or the database. Although the server directs the system's operation, the modules and other cryptographic elements of the system maintain the integrity of data flowing through the system without relying on the server's software.

Each of the cryptographic modules of the present invention is capable of performing Key management, whether the module implements a secret key (symmetric) algorithm or a public key (asymmetric) algorithm. Secret keys and private keys are protected from unauthorized disclosure, modification or substitution. Public keys are protected against unauthorized modification or substitution. Detailed key management requirements are defined in FIPS 140-1, the contents of which is incorporated by reference herein. Cryptographic key management is typically concerned with the entire life cycle of the cryptographic keys employed within a cryptographic-based security system, including their generation, distribution, entry, use, storage, archiving and destruction.

FIPS 140-1 allows key generation for a cryptographic module to be done either inside the module or outside the module and then loaded into the module. Because the postage server uses many identical modules to perform the PSD functions, certain keys are generated and distributed to the other identical modules. All keys are generated using FIPS approved key generation algorithms, for example the following FIPS approved Standards, the contents of which are hereby incorporated by reference herein.

FIPS PUB 46-2: Data Encryption Standard (DES)
FIPS PUB 46-3: Requirements for 3DES
FIPS PUB 112: Password Usage
FIPS PUB 180-1: Secure Hash Standard (SHA-1)
FIPS PUB 186: Digital Signature Standard
ANSI X9.52-1998 Triple Data Encryption Algorithm Modes of Operation
PKCS#1:RSA (1024 bits)
PKCS#3: Anonymous Diffie-Hellman.

Each module provides key management support for keys that are used for user data protection. The module is used for the management of a large number of postage meters. Presumably, this number may be too large for (permanent) storage inside the modules. Therefore, all data pertaining to postage meters is stored external to the modules. This necessitates security mechanisms guarded by the module to maintain authenticity and confidentiality of this meter data. In addition, load balancing requires the sharing of the load between multiple modules. Finally, it is not feasible to predict which module will be processing a certain meter. This leads to the following features:

Each module supports confidentiality (encryption) and authentication of user data sets when stored outside the module. These keys used for this are called the Master Encryption Key (MEK) and the Master Authentication Key (MAK), respectively.

Each module supports encryption and authentication of the key token format: DES (sccDES_Key_t), DSA (sccDSAKeyToken_t) and RSA (sccRSAKeyToken_t), and preferably also generic support for arbitrary-length key data buffers.

Each module supports generation of Master Keys (MEK and MAK) using the module's hardware-based RNG. Encryption meets FIPS 46-3 requirements for 3 DES.

Each module provides a backup strategy for Master Keys that maintains security with guaranteed availability under all reasonable circumstances.

Each module supports activation and de-activation of Master Keys.

Each module supports rollover from one Master Key Set (MEK and MAK) to another set. This implies support for two Master Key Sets, an active one, and a dormant one. In addition, each module provides translation of data protected under one of these sets to protection under the other set.

Each module supports deletion of a (dormant) MKS. This is required in case of compromise of an MKS.

Decryption of the data set and verification of its authenticity by another module different than the one that created the encrypted data set is also possible. This implies the requirement of sharing (cloning) of the decryption and authentication keys between modules.

Export of a Master Key Set (MKS) to another module.
Import of an MKS from another module.
Export and Import of an MKS is encrypted and authenticated.
Import and export is under dual control; at least 3 users should be involved.
The module that exports an MKS determines whether this MKS is exportable from the importing module.

A MKS is generated in the master module The master module can export an MKS to other modules, in shares, each encrypted under the destination module's Transport Public Key. This process requires prior export of the Transport Public Key from the destination module by a Key Custodian, and provision of that key to the master as an input parameter to the Export Share command. The generation of the Transport Key Pair is done in Initializing state; this command transitions to Importing Shares state. The export of the Transport Public Key is done in Operational or Importing Shares state; the actual import of the MKS is preferably done in Importing Shares state.

The Transport Private Key is a retained key; it can not be exported outside the module it was generated in. This ensures that export of an MKS always is destined for one well-determined module. Generation of a Transport Key Pair only in Initializing state ensures that a module has only one Transport Key Pair in its lifetime; a Reset is required to return to Initializing state. Moreover, transition from Initializing to Importing Shares state upon generation of the Transport Key means that any module should have an MKS when in Operational state.

A MKS can be exported as an exportable MKS or as a retained MKS. This is a property of the exported key itself; the destination module respects this distinction. An exportable MKS can be exported in the same way as the master exports its internally generated key. A retained key cannot be exported (attempted export of a retained MKS will fail). This architecture allows for limitation of the number of modules with an exportable MKS. Unless all of these modules have to be reset, one can always create additional modules with the same MKS. At the same time, there can be fairly tight control over the (few) modules with an exportable MKS.

In case all exportable copies of an MKS are lost (all modules containing an exportable copy are reset or lost) one can still continue processing with any modules that are still operational. Next, one can create a new MKS (possibly in a new master) and export that to all operational modules. These modules then can roll over to the new key. Subsequently, one can add new modules with this new MKS, like before.

Preferably, all operational modules can be brought back to operational state with the proper MKS as long as at least one exportable copy of this MKS exists. If all exportable copies are lost, one could just continue operating with any remaining operational copies, generate a new MKS in the master (possibly a new module) and roll over to that new MKS in the operational modules. Subsequently, one can create new modules with that MKS, just like before.

This implies that no special backup procedures are required; the cloning procedures and the fact that all exportable copies of an MKS act as each other's backup copy are sufficient to maintain availability under all circumstances that can reasonably expected to occur.

To maximize the probability that at least one exportable copy of the MKS is always available, an additional MKS backup copy can be created by reserving a separate (non-operational) module for its storage. To avoid existence of an operational module without attendance, the import of the MKS is preferably only done when the backup copy is needed. Preferably, the export is done in an n-out-of-m-secret sharing scheme (Shamir).

In the descriptions below for losing keys, the backup shares together with the backup module are considered to constitute an exportable MKS. Note that the backup module use requires prior import of n of the m shares.

If no exportable copies of the MKS are lost, no capabilities are lost, just operational capacity (bandwidth). This allows a quick return to full capacity in case a module is lost (see below), as well as increase of capacity, since the MKS can be exported to a new module.

The recovery procedure is repeated for each of the modules that have lost the MKS.

For a new module or if the transport key is also lost:
reset (or replace) the operational module and generate a new Transport Key Pair in Initializing state;
export the Transport Public Key from the destination module;
export encrypted shares of the MKS (for this Transport Public Key) from the source module;
import the encrypted MKS to the destination module;
activate the MKS in the destination module.

If some (but not all) exportable copies of the MKS are lost, the remaining copies can still export, therefore, no capabilities are lost. (Some capacity may be lost) This allows a quick return to full capacity by restoring the MKS in all modules that lost it (or in their replacement).

If the only remaining exportable MKS is the backup copy, first import n of the backup shares into the backup module. This module now is a normal module with an exportable MKS, so the remainder of the procedure is the same as described above. In this case, all operational modules can continue operating with the current MKS. The only capability lost in this case is export of the MKS, and therefore the addition of new modules.

The Recovery procedure is as follow:
Reset (or replace) the master;
Generate a new MKS in Initializing state;
For each module that is still operational:
  Import this module's Transport Public Key;
  Export the new MKS from the new master, encrypted under this Transport Public Key. If the destination module contains a retained copy of the old MKS, the exported MKS should be a retained copy, else it may be an exportable MKS;
  Import the new MKS into the operational module;
  Translate the protection of all data from the old MKS to the new MKS;
  Activate the new MKS in each of the operational modules.

This returns the system to a state equivalent to that before loss of all exportable copies of the MKS. In particular, new capacity can now be added again. However, during this recovery, the system has a reduced capacity (only modules that are still operational are running).

All keys involved in session key management (ephemeral DH keys, session master keys and transaction keys) are maintained by session management (described below). Local keys are used for encryption of sensitive data stored in persistent memory, to avoid exposure in case of tampering. One mechanism chosen for this is the PPD read/write mechanism for the memory (sccSavePPD and sccGetPPD) where the encryption keys are stored in NVM (which is cleared on tamper). The key management is internal to the module.

Key management services related to cloning and management of the MKS include:
The Key Management Services module interface function
Generate MKS
Generate Transport Public Key (TPK)
Export Transport Public Key
Create MKS Shares
Export MKS Share
Leave Exporting Shares state
Start Importing MKS (transition to Importing Shares state)
Import MKS Share
Combine MKS Shares
Activate MKS (deactivates old MKS, if any, and activates a new one)
Delete the dormant MKS
Encryption and/or MAC Translation (decrypt and verify MAC under old MKS; compute MAC and re-encrypt under new MKS)
Usage of the MKS include:
Compute MAC and Encrypt
Decrypt and verify MAC
Compute MAC
Verify MAC The following two keys are generated by a module when the start initialization command is executed. These keys are not shared with other modules.
ASK, audit signing key. This is a 1024-bit DSA key used to sign entries in an audit log.
Audit Verification Public Key. This key is output from the module and will be used to authenticate the audit record log.

The following two keys are generated by a Master cryptographic module when the MKS command is executed.
MEK, the master encrypting key. This is a triple-DES key used by the module to encrypt all external key tokens for keys that are generated by the modules.
MAK, the master authentication key. This is preferably an 8-byte key used to generate a DES MAC for key tokens encrypted by the MEK.

The following two keys are generated by the modules that are not Masters when the generated transport key command is executed.
V_TPK, Transport Private Key. This is an RSA key used by a non-master module to decrypt the imported MKS key.

U_TPK, Transport Public Key. This is an RSA key used by a master module to encrypt an MKS key that will be distributed to another module.

The module's system software (CP/Q++) generates the following key during CP/Q++ initialization.

PPD key. This is a DESkey generated by the CP/Q++ and used to encrypt keys that are stored in the module's flash memory. The key is not accessible outside the system software.

The module generates the following keys for use during secure sessions with the host computer.

Session Master Keys. This is a set of two keys, generated for a given secure session, used to derive session transaction keys. One key is for authentication (DES MAC computation) and the other for security (Triple-DES encryption). The keys are destroyed at the conclusion of the secure session.

Session Transaction Keys. These keys are used for a single transaction during a secure session. They are derived by a one-way function of the Session Master Keys combined with a transaction counter.

The following five keys are generated by a module when the initialize crypto-card command is executed.

VDSK_ipost, the DSA private key used by the modules to sign challenges during client registration. The key is output in a key token for distribution to other modules.

UDSK_ipost, the DSA public key that is imbedded in the client application software and is used to authenticate challenges signed by the module during client registration.

The key is output from the module after generation.

VRSK_ipost, the RSA private key used by the modules to decrypt client secrets transmitted to the modules during client registration. The key is output in a key token for distribution to other modules.

URSK_ipost, the RSA public key that is imbedded in the client application software and is used to encrypt client secrets transmitted to the module during client registration. The key is output from the module after generation.

MK_chkpt, the DES MAC key used to authenticate a checkpoint database record when it is returned to a module from the database. This key is derived from VDSK_ipost by hashing it using SHA-1 each time that VDSK_ipost is imported by the module.

The following keys are generated by a module at the time that a PSD package, the database record containing a postage meter's data, is created.

V_psd, the DSA private key used to sign indicia created by this VBI meter. This key is stored in the meter's PSD package as a key token, encrypted by the MEK.

U_psd, the DSA public key used to authenticate the signature on indicia created by this VBI meter. This key is output from the module to the provider after generation.

MK_psd, the DES MAC key used to authenticate a PSD package when it is returned to a module from the database. This key is derived from V_psd by hashing it using SHA-1 each time that V_psd is imported by the module.

EDEK_psd, the 3DES key-encrypting-key used to encrypt the client secrets transmitted to the module during client registration. This key is stored in the client's PSD package as a key token, encrypted by the MEK.

FIPS 140-1 allows key distribution to be performed by manual methods, automated methods, or a combination of automated and manual methods. Keys are input to a module when required to initialize the module and to initialize the PSD packages of each meter. These key transfers are not considered key distribution. Also, FIPS 140-1 allows key entry and output procedures to differ depending upon the key distribution technique employed. The cryptographic module does not implement manual key entry. All secret or private keys are input to or output from the module electronically and are encrypted.

The system of the present invention utilizes a plurality of cryptographic modules that need to work in concert. This entails creating a shared secret for all the modules. In one embodiment, key entry is required to initialize a new clone module for service at the service provider's facility. Preferably, only one module functions as a master module. The master module generates a Master Key Set (MKS). The exporting of the shares of the MKS keys requires dual control. The Security Officer should first issue a create MKS shares command to specify the number of shares to be created and to authorize the export of the shares.

In one embodiment, the module uses a Pseudo-Random Number Generator (PNRG) to generate the MKS, which contains two distinct keys:

1. Master Encryption Key (MEK): A 3DES key used to encrypt keys when stored outside the module.
2. Master Authentication Key (MAK): This is a key used to compute the DES MAC for signing keys when stored outside of the module.

The MKS is stored in a non-volatile memory (NVM) within the module.

When the required number of shares are input to a module, a Key Management Officer can then enter an export share command to export one of the MKS shares. Input as part of the export share command is the transport public key of the new module being cloned. This public key is used to encrypt each key share before it is exported and stored on a storage medium such as a floppy disk, a CDROM, or the like. After the last share is exported, the Master module returns to the operational state and will no longer output key shares.

For the modules that are not masters, the Security Officer uses the generate transport key command to request the module to generate the transport key pair. This command also establishes that the module is not a master module. The transport public key is output for use by a Key Management Officer when exporting MKS key shares from a Master module. To input MKS shares to a module, the Security Officer must send the start importing shares command to the destination module. Key Management Officers can then enter their shares from their floppy disks, CDROMs, or the like until all have been entered. The destination module uses its transport private key to decrypt the key shares. The process is completed when the Security Officer sends the combine shares command.

The MKS is used to generate external key tokens by MACing the key with the MAK and Triple-DES encrypting it with the MEK. After a new module has been loaded with the MKS, the Security Officer can use the initialize crypto-card command to export key tokens from the module or to load it with key tokens generated by another module.

In one embodiment for secure printing of postage values, the following four keys are input to a module using the initialize crypto-card command.

VDSK_ipost, the DSA private key used by modules to sign challenges during client registration.

VRSK_ipost, the RSA private key used by modules to decrypt client secrets transmitted to the module during client registration.

U_ca, the USPS Certificate Authority's X.509 certificate.

UDSK_auth, the DSA public key used to authenticate signatures on messages from the provider infrastructure.

At the time of customer registration, the key URSK_ipost, embedded in the client computer cryptographic software is used to encrypt client secrets before transmitting them to the module. These secrets include:

- HMK, the client's MACing key. The key is used to generate a DES MAC for mutual authentication of messages between the client and the module.
- PW, the hash of the customer's passphrase. The hash of the passphrase is used to authenticate the customer to the module if the client's copy of HMK is lost.

The module uses the private key VRSK-ipost to decrypt these client secrets before storing them as an encrypted key token in the meter's PSD package.

Within the module, the permanently stored secret keys are stored in designated NVM locations that serve to adequately identify their function. Secret and private keys that are stored outside the module as part of a PSD package are contained in key tokens. Key tokens are data structures that identify the keys and include other information relevant to the keys. The key tokens are authenticated by the MAK and encrypted by the MEK. When these keys are inside the module they are stored in designated locations in volatile memory.

The cryptographic module of the present invention provides the capability to zeroize all plaintext cryptographic keys and other unprotected critical security parameters within the module. For example, the IBM 4758 stores all plain text keys and other SRDI's in BBRAM (NVM). Zeroization of all BBRAM contents occurs if the module's tamper detection envelope senses intrusion. A system user can also destroy these SRID's by disconnecting the external batteries that provide backup power to the module. These features allow the 4758 to meet FIPS 140-1 requirements. FIPS 140-1 allows for a cryptographic module to output encrypted keys for archiving purposes. In one embodiment, each module implements key archiving mechanisms.

A state machine determines the availability of module commands in conjunction with the roles that a user takes up. In other words, the state and the current user role together provide sufficient information to decide whether an action is allowed or not. Most commands require authentication for transport from the host to the module. Therefore, an active session is derived requirement for execution of these commands. This requirement is explicitly verified by these commands, however.

Invalid data may lead to failure of execution. However, verification of validity is considered the first step in execution. The decision to start execution depends on the state and the user role alone; validity of input data does not play a role in that decision. The complete module state or the state of any module application may be composed of the module state as described in this document, complemented with other state information maintained by other libraries. Exemplary states are described below.

Uninitialized state. This is the initial, state that the module is in immediately after loading the code and booting. No security related data has been loaded. The only available command is the Start Initializing command.

Initializing state is the state that the module is in during the initialization process. In this state, the access control database is initialized and the MKS is generated or its import is initiated. The module exits this state when an MKS is generated (next state: operational) or when a Transport Key Pair is generated (next state: importing shares).

Operational state. In this state, all normal operational commands can be executed. Depending on the user role(s) these can be administrative (change password), postage meter related, session management or auditing commands. In addition, certain key management commands (activation of a new MKS and deletion of a dormant MKS) are available. Finally, special commands transition to other states (administrative, exporting shares, importing shares) for special restricted commands.

Administrative state. This state includes all access control maintenance commands, such as adding, deleting, viewing and modifying user accounts. The module enters this state from Operational state when a Security Officer issues the Begin Admin command in operational state. It remains in this state until the Security Officer issues the End Admin command (next state: operational).

Exporting Shares state. This state allows the Key Custodians to export shares of the MKS. The module enters this state from operational state when a Security Officer issues the Create MKS Shares command. It remains in this state until all shares have been exported (via the Export MKS Share command) or the Abort Export command is issued (in both cases, the next state is operational). If the Abort Export command is issued before all shares are exported, the exported shares may be useless.

Importing Shares state. This state accepts the import of shares of the MKS. The module enters this state from operational state when a Security Officer issues a Start Importing MKS command. It remains in this state until a Combine Shares command is issued (next state: operational if an MKS exists after completion, else error).

Error state The coprocessor enters this state on (fatal) errors. Depending on the severity of the error, it should be cleared by rebooting, or the coprocessor should be reset (next state: uninitialized). Only audit entry creation and session commands are possible in this state.

Figure 6:
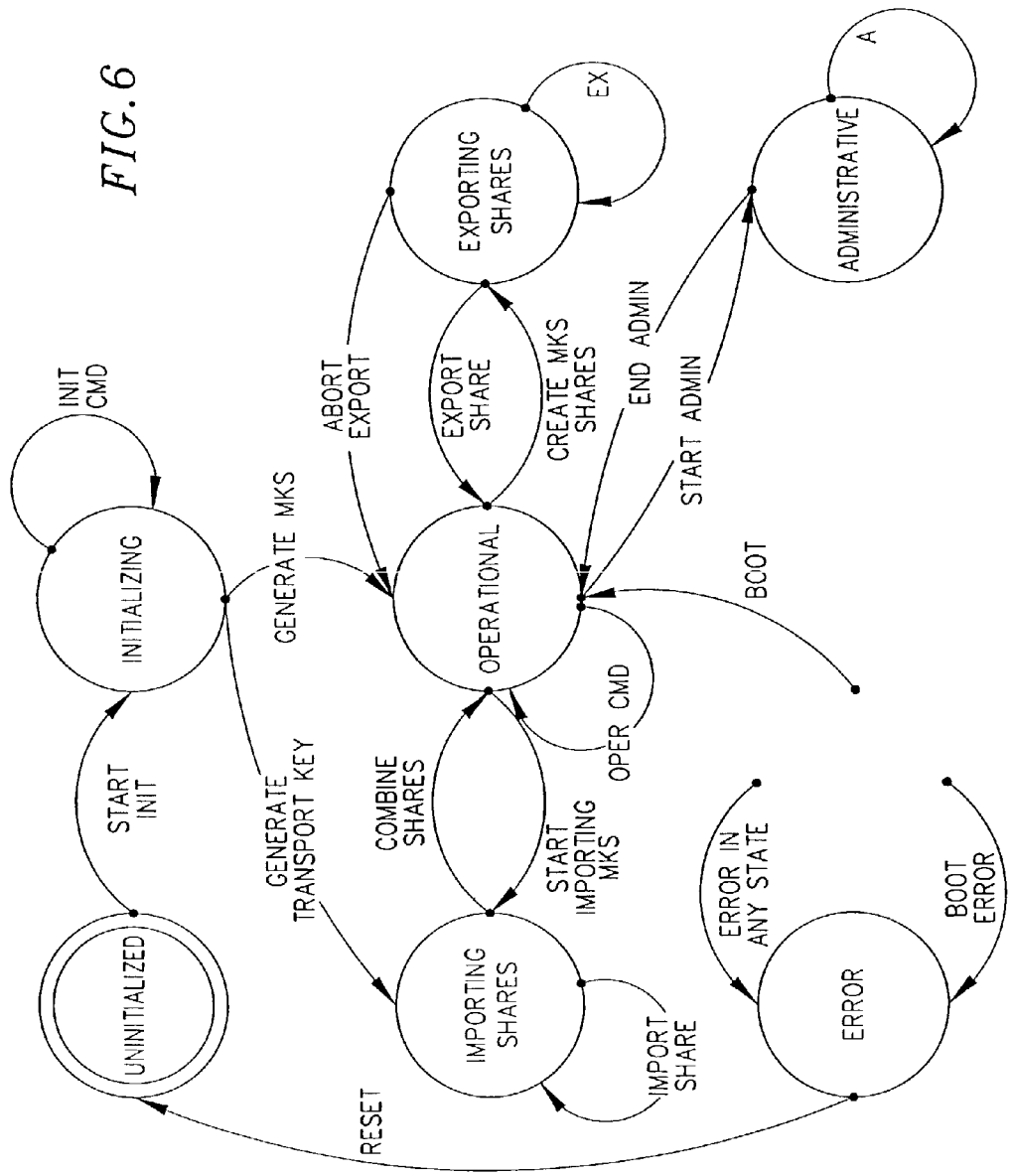
FIG. 6 is an exemplary state transition diagram for a cryptographic device according to one embodiment of the present invention.

FIG. 6 illustrates an exemplary finite state machine. The logon and logoff functions, session management commands, access control queries, and audit entry creation are available in all states except uninitialized and error.

Within any thread in the module, it is not possible to interrupt processing, and to resume processing at another instruction than where it was interrupted. The only exception to this rule is rebooting. Rebooting interrupts processing, and starta at a given fixed location in the application.

In one embodiment, two variables hold the current state information: Current State and Persistent State. The latter is stored in NVM. This allows for atomic state transitions and for retaining state information across rebooting. Atomic state transitions can be implemented by first updating Current State, then performing all required actions, and finally updating Persistent State. If the module is rebooted during this sequence, the old state is retaine in Persistent State. Thus, if Persistent State has been updated, one is assured that the full transaction has been executed. In addition, it can be used to retain Error state information as required.

Before executing any function, the module verifies whether a reboot has occurred by checking a boot detection flag in the NVM. A reboot clears NVM, thus also clearing this flag. Therefore, the first call to the module after a boot will find this flag cleared. After performing any required initialization, the flag can be set.

Initialization includes the following boot detection. When the reboot flag is found set, no action is taken. When the reboot flag is found cleared, the value of the Persistent State variable is examined, and the following is done.

If it is Error: a fatal error has occurred, and Current State is set to Error.

If it is Initializing: Persistent and Current State are set to Error, as this is a fatal error.

If it is Importing Shares, and if there is no active MKS, Persistent and Current State are set to Error, as this is a fatal error. (If the module contains a valid active MKS, both Current State and Persistent State are set to Operational, see below.)

If it is Exporting Shares: Current State is set to Error, as this is a non-fatal error.

If it is Uninitialized: no successful initialization has been performed and Current State is set to Uninitialized.

If it is Importing Shares, and if the module contains a valid active MKS, both Current State and Persistent State are set to Operational.

Else: both Current State and Persistent State are set to Operational.

Unless specified otherwise, all state transitions mentioned in this document are performed by first updating Current State, and then updating Persistent State. Atomic actions are enclosed within such a state transition.

The module is in Uninitialized state immediately after loading all software and booting. In the Uninitialized state, no commands can be accepted, except the "Start Initialization" command. This command erases all non-volatile memory. This erases all data and keys present in the module, in particular the Master Keys and the access control database; set the internal module clock; creates the Audit Signing Key; creates the first audit entry, capturing this event; and transitions to the Initializing state.

Preferably, the only way to return to Uninitialized state is to reset the module. This together with the fact that initialization always erases all data, ensures no data survives a reset. The Uninitialized state serves as a shield to make sure no transitions to Initializing state are possible from other states without losing all data and keys.

The Initializing state contains those commands that are to be executed once in the lifetime of a module. The only way to enter Initializing state is by issuing the "Start Initialization" command from the Uninitialized state. This ensures that upon entry to the Initializing state, no data or keys are retained. Here, the module is in an entirely clean state. In Initializing state, the following actions/commands are allowed:
  Get Status
  Initialize Access control database
  Logon
  Logoff
  Query Current User Role
  Query Current User ID
  All Session Management commands
  Audit entry creation
  Generate Master Key Set
  Generate Transport Key Pair.

The last two commands represent the only means to establish a Master Key Set (MKS) in a module. A module can either generate a Master Key Set (MKS) itself, or it can import one and encrypt it under its own Transport Public Key (TPK). These two commands perform the generation respectively and prepare the import (by generating the import encryption key pair). In summary, the Initializing state serves to initialize the module and the sharing of the MKS. These initializations are one-time activities; the former mainly because there is no need to repeat it; the latter because it is not allowed to happen repeatedly.

All normal, operational commands are executed in Operational state. That is, Operational state contains commands implementing all actions not related to initialization of a module, the maintenance of the access control database, or key management (with the exception of key usage). The following are examples of commands in Operational state associated with different functions.
  Access Control
    Begin Admin (transition to Administrative state).
    Logon
    Logoff
    Query Current User Role
    Query Current User ID
    View Access control database
    Change password
    Set clock
    Get Status
  Session Management
    Open Session
    Close Session
    Compute Session MAC
    Verify Session MAC
    Session Encrypt
    Session Decrypt
  Key Management
    Key management related to cloning and management of the MKS:
      Export Transport Public Key
      Start Importing MKS (transition to Importing Shares state)
      Create MKS Shares (transition to Exporting Shares state)
      Generate MKS
      Activate MKS (deactivates old MKS, if any, and activates a new one)
      Delete dormant MKS
    Usage of the MKS:
      Global Encrypt and MAC
      Global Decrypt and MAC
      Compute MAC
      Verify MAC
    MKS Rollover:
      Encryption and MAC Translation (decrypt and verify MAC under old MKS; compute MAC and re-encrypt under new MKS)
  Audit Support
    Audit Entry creation
    Audit Key Creation
    Export of the Audit Verification Key All administrative commands supporting access control are executed in Administrative state. That is, Administrative state contains commands implementing:
  Creation of an account
  Deletion of an account
  Modification of an account
  Viewing the access control database. This command lists all users and their roles, account expiration, last access, but not the user passwords.
  End Admin (transition back to Operational state).
  Logon
  Logoff
  Query Current User Role
  Query Current User ID
  Set clock
  Get Status
  All session management commands
  Audit entry creation.

Preferably, all these commands (except session key usage) are audited.

As shown in FIG. 6, Administrative state is entered by the Start Admin command, issued by a Security Officer. The administrative commands in Administrative state require Administrator user role. This separation of roles ensures dual control. Secondly, the transition to administrative state will ensure that no operational commands can be issued by the Administrator (separation of duties).

The Exporting Shares state exports encrypted shares of a Master Key Set. When the last share in a secret sharing scheme is exported, the module transitions to operational state. All these commands are audited. (Audit entry creation.) Only an exportable MKS can be exported this way (i.e., internally generated or imported as exportable; by default an imported MKS is a retained key). The export is initiated by a Security Officer issuing the Create MKS Shares command in Operational state. This command changes state to Exporting Shares. The actual export of the encrypted shares is done through the Export Share command, issued by a Key Custodian. Encryption of the shares is under the Transport Public Key. This key is provided by the Key Custodian as an input parameter to the Export Shares command. Rebooting while in Exporting Shares state may be a fatal error.

The following commands are available in the Exporting Shares state.
- Logon
- Logoff
- Query Current User Role
- Query Current User ID
- Export Share
- Abort Export
- Get Status
- All Session Management commands
- Audit entry creation.

In the Importing Shares state, a module imports encrypted shares of an MKS. The encryption is done under the Transport Key. Importing shares state is entered by Issuing the Start Importing MKS command. The actual import is performed by repeating the Import Share command as required. Combination of the shares to a MKS transitions to Operational state is also possible. All these commands are audited. (Audit entry creation.

The following commands are available in the Importing Shares state.
- Logon
- Logoff
- Query Current User Role
- Query Current User ID
- Export Transport Public Key
- Import Share
- Combine Shares
- Get Status
- All Session Management commands
- Audit entry creation.

In Error state, no cryptographic operations may be performed. Thus, the only commands available in the Error state are Get Status, Access Control Queries. A reset erases all NVM and changes to Uninitialized state. Fatal errors set both Persistent State and Current State to Error. This ensures that rebooting will not clear the error. Therefore, the only way to clear fatal errors is a Reset command, or by a complete re-initialization of the module by other means (both methods change state to Uninitialized). Non-fatal errors only set Current State to Error; the Persistent State is not modified. A subsequent reboot clears the error, unless a boot error occurs. All Module command requests in Error state, with the exception of Get Status, return an error and do not output any data. Error states are preferably non-fatal, with the following exceptions (i.e. these only set Current State to Error):
- failure in Audit Entry Creation which doesn't breaks the audit chain; and
- detection of Exporting Shares state during boot-up Throughout the lifecycle of a module, its software keeps track of the module's present operational state and allows only the operations that are allowed for these module states. Each PSD package also contains information to define its present operational state. When the module is loaded with a PSD's package, module software will only perform operations that are allowed for the present state of that PSD. The following paragraphs describe the states of the module and the PSD package throughout their operating life.

When the module is first operated after its software is loaded, it starts in the uninitialized state. Preferably, the only command that it will accept is the start initialization command and the start initialization command will only be executed if the module is in the uninitialized state. During this phase of life, the Module is not considered to be a crypto module and no authentication is required to issue this command. The start initialization command first erases all non-volatile memory to destroy any cryptographic keys or access account database entries that may persist from previous use of the module. When memory erasure is completed, the module transitions to the initializing state.

The Initialized state includes commands that can be executed only once in the life of the module. Because this state can only be entered from the uninitialized state, an existing module cannot be modified by using these commands. Within this state the access account database is initialized. If a master module is being created, the master key set (MKS) is generated and the operational state is entered. If the module is not a master, the transport key pair is generated and the Importing shares state is entered.

Preferably, the module Exporting Shares state can only be entered from the Operational state. Once the master module generates the MKS it can export it to another module. In one embodiment, this is accomplished by using an n of m Shamir secret sharing technique, as follows:

1. A target (clone) module is initialized, following the steps described above.
2. The Security Officer logs on to the newly initialized target Module and issues a command to generate a transport key pair (TPK). The TPK is a RSA public key used for transporting an MKS previously generated by the master module. The private portion of the TPK is retained in the new module and can never be exported from the module that generated it. This control ensures that MKS export is always destined for one well-determined target module. The public portion of the TPK is saved on to a floppy disk, a CDROM, or the like.
3. The public portion of the TPK is saved onto a storage medium such as a floppy, CDROM, or the like and physically carried over to the machine housing the master module. The Security Officer logs on to the master module and issues the create MKS shares command. The create MKS shares command accepts two arguments: (1) the number of shares to be created (n, one share per key custodian) and (2) the threshold number of shares required to recombine the shares. A successful create MKS command results in n number of shares, where n is greater than or equal to 2.
4. A Key Custodian logs in and initiates the export MKS shares command on the master Module and chooses whether the exported key pair should be an exportable or retained key pair for the destination module. An exportable key pair permits the destination module to export key shares in the same manner as the original master module. With a retained key pair, the new cloned module cannot export key shares to other cryptographic modules. The export MKS shares command validates the current key custodian and then encrypts an MKS share with the TPK. The TPK-encrypted share is saved to a floppy, a CDROM, or the like. This procedure is repeated for each key custodian specified in step 3, above.

The module Importing Shares State can be entered from the Initializing state (to load the MKS for the first time) or from the Operational state (to load a replacement MKS). The following describe in more detail the importation of the MKS key shares for generation of the master key set in a module. Once the master Module encrypts the MKS shares and saves them to floppies, the shares can be imported into the target module.

1. The Security Officer logs into the target module and initiates the start importing MKS shares command.
2. The first Key Custodian inserts their MKS share floppy or CDROM, logs in, and issues the import MKS share command. The target module reads in the first share. This procedure is repeated for each Key Custodian.

When the final Key Custodian has finished entering the key share, the Security Officer logs in and issues the combine MKS shares command. The combine MKS shares command causes the target module to unencrypt each share and combine them to create the MKS. The shares are destroyed following this procedure. The MKS is stored in the NVM as described above.

Once in the Operational state, the module is capable of completing its remaining initialization steps. The security officer sends an initialize crypto-card command to load all other required module shared keys (These are described in the Key Management section). The administrator can enter the access control data for all other personnel that require authenticated role access to the module.

When the module is initialized, it does not become a PSD until PSD packages are created. A PSD package is created using the initialize PSD command. This creates a data structure that contains the PSD package data elements. One data element is the present state of the PSD. The module will only allow the PSD to perform operations that are allowed for its present state. When the initialize PSD process is completed, the PSD state changes to the raw state.

In one embodiment, the PSD package for each meter user contains all data needed to restore the meter's PSD to its last known state when it is next loaded into a module. This includes the items that the IBIP Performance Criteria specifies to be stored inside the PSD, information required to return the PSD to a valid state when the record is reloaded from the database, and data needed for record security and administrative purposes. In this embodiment, the PSD package includes the following items:

Ascending and descending registers
Device ID
Indicia key certificate serial number
Licensing ZIP code
Key token for the indicia signing key
The user secrets, (the client DES MAC key and the SHA-1 hash of the client's passphrase).
Key token for EDEK_psd, the key for encrypting user secrets
Data needed to maintain operating continuity includes:
Date and time of the last PSD transaction
The last challenge received from the client
The operational state of the PSD (leased, withdrawn, etc.)
Expiration dates for keys
The passphrase repetition list (eliminates reuse of recent passphrases)

The IBIP Performance Criteria specifies that the PSD should store the public key certificate for the USPS CA. Because all meters require this information, it serves no purpose to repeat this data in each PSD package. Instead, the certificate for the USPS CA public key is stored in the memory of all the modules.

The following describes the PSD package states.

Raw state. As a result of initialization the meter serial number is assigned, the postal registers are set to zero, the PSD keys are generated, and all other initializing steps are performed. The provider receives the PSD public key and device ID needed to obtain the PSD's public key certificate. Preferably, the only command that can be executed while in the raw state is the authorize PSD command.

Unleased state. The authorize PSD command loads the PSD public key certificate and changes the PSD state from raw to the unleased state. Preferably, the only command that can be executed while in the unleased state is the configure PSD command.

Assigned state. The configure PSD command assigns the PSD to a customer, allows entry of the customer shared secrets, and places the PSD in the assigned state. When the customer's postal license is issued, the authorize customer command enters the customer's originating zip code and places the PSD in the leased state.

Leased state. Once in the leased state the PSD is ready for the customer to use. The meter can begin printing indicia once the first postage value download had been completed.

Password Reset state. This is a temporary state to allow a lost password to be replaced.

Withdrawn state. The user's account has been closed or suspended. This state is entered from the leased state or pwreset state by executing the create refund indicium command. The PSD package remains in the database where it can be accessed by the server but after entering the withdrawn state the Module will no longer execute any PSD command when loaded with this PSD package.

The PSD packages are stored outside the modules when not being used and the module is able to detect when record storage problems have occurred. In one embodiment, a Redundant Array of Independent Disks (RAID) and a database server are used together to provide reliable operation of the database. Multiple copies of each record are maintained and a locking system is used to prevent more than one postal server from simultaneously accessing one meter's PSD package. If a partial failure of the RAID occurs, the system transparently switches to backup records.

In one embodiment, the cryptographic modules store up to five transactions in a respective internal register. The number of transactions compared in the verification process system may be set by the system administrator. A verification process compares a predetermined number of last transactions. The database subsystem stores a table that preferably includes the module(s) present in the Postal Server subsystem, the module serial numbers, the time of the last transaction the module processed, the date of the last transaction the module processed and the value of the last transaction the cryptographic module processed. Other values related to a transaction and a module can also be saved for verification purposes. An example of the module table, where the Postal Server subsystem has four modules, is illustrated below.

| Cryptographic module | Cryptographic module Serial. # | Transaction Time | Transaction Date | Transaction Value |
|---|---|---|---|---|
| 1 | 34576590 | 11:53 PM | Aug. 6, 1999 | $0.33 |
| 2 | 34582152 | 07:30 AM | Aug. 5, 1999 | $7.55 |
| 3 | 34593104 | 03:00 PM | Aug. 2, 1999 | $3.45 |
| 4 | 34593992 | 11:22 AM | Aug. 3, 1999 | $5.78 |

When a cryptographic module loads a new PSD out of the Database subsystem (performing a transaction), the module's register, containing the last transaction's time, date and value, is verified against that module's entry in the Database subsystem's module table. The time, date or value for each transaction stored in each module should match the corresponding values for the respective module stored in the database for the verification process to be successfully completed. Cryptographic modules do not load new PSD transactions unless the verification process has been successfully completed. If any of the compared values is found to be different, preferably the whole system shuts down until authorized personnel can investigate the situation. In one embodiment, the threshold in the system is adjustable so that the system may be set to shut down if one, two or more modules fail the verification process.

Figure 5:
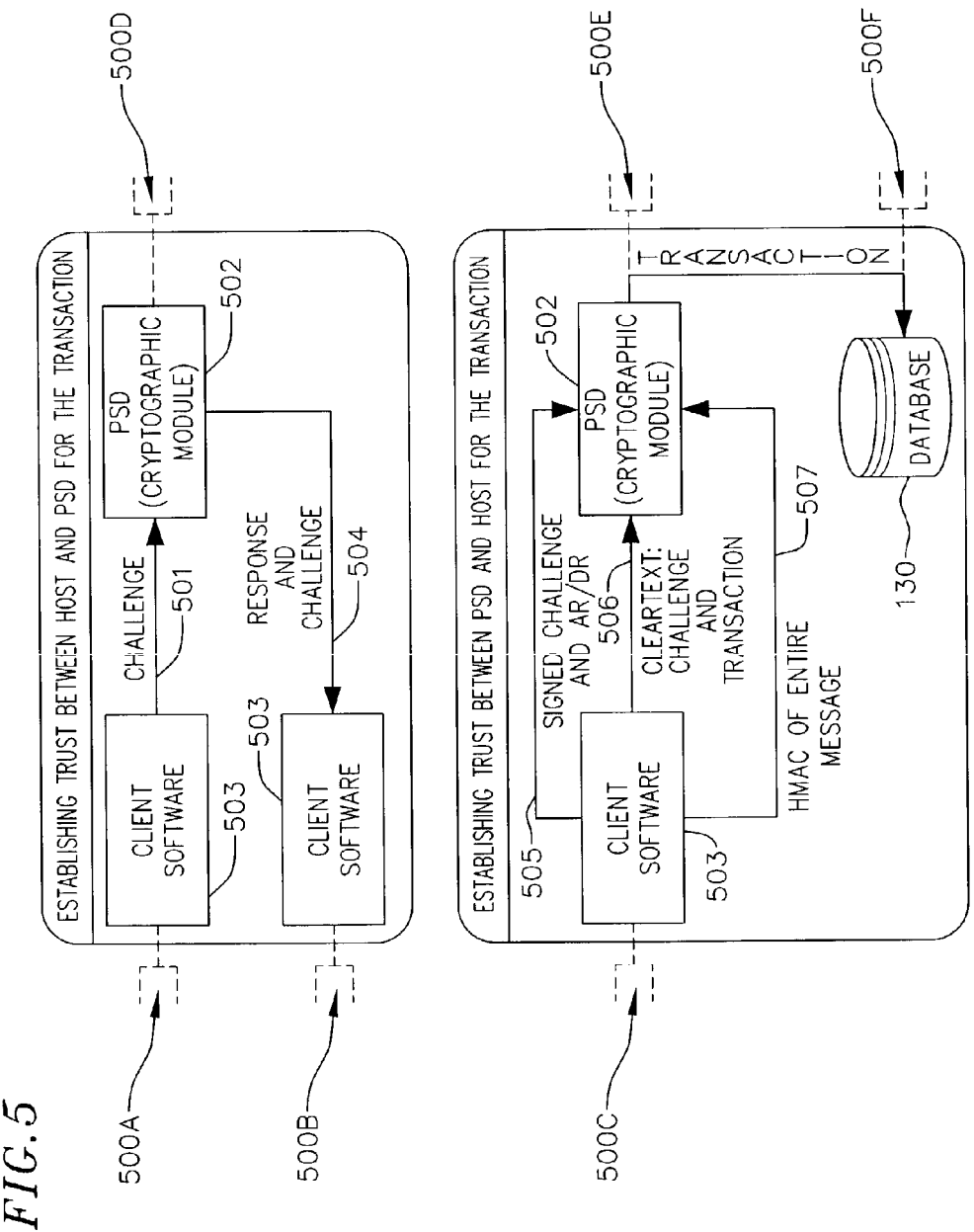
FIG. 5 is an exemplary block diagram of a client software, a cryptographic module, and a typical transaction between them during an operational state according to one embodiment of the present invention.

With the success of the authorization state, the client software not only trusts the cryptographic module, but also shares a common HMK with the cryptographic module, which it uses to sign and challenge each successive message. FIG. 5 is an exemplary embodiment illustrating client software and cryptographic module (PSD) communication during the operational state. Client software 503 sends a new challenge message to cryptographic module 502, as shown by 501. The cryptographic module responds by signing the challenge with the shared HMK and then sends this ciphertext back to the client software, along with its own challenge, as shown by 504. Client software 503 compares the ciphertext of the challenge it originally sent to the cryptographic module, and also signs the message received from the cryptographic module.

If the signatures compare, the client software trusts the cryptographic module for this transaction. Client software 503 uses the cryptographic module challenge message to authenticate itself to cryptographic module 502. Client software 503 now sends the signed challenge that cryptographic module 502 had sent, with the addition of the client software local record of the user's AR and DR, as shown by 505.

The client software also sends a cleartext of the challenge and the transaction message, as shown by 506. Next, the client software sends a Hash Message Authentication Code (HMAC) for all of the data sent in 505 and 506, using shared HMK, as shown by 507. HMAC is a digital signature created using a hash algorithm with an arbitrary message and the secret key (HMK). The client software sends the original arbitrary message and the HMAC to Postal Server via the network. HMK, as the HMAC Key, stays in the client software 503. The cryptographic module 502 already has a copy of HMK because it was sent over to Postal Server during the user registration process. In another embodiment, Data Encryption Standard Message Authentication Code (DES MAC) is used instead of HMAC.

In one embodiment, the client software generates a random 64-bit challenge as shown by 500A in FIG. 5. The PSD signs the host's challenge, using the HMK shared during registration. The PSD returns the above, as well as its own 64-bit challenge as shown by 500D in FIG. 5. The client software compares the HMAC of the challenge it sent with the HMAC it receives from the PSD. The host trusts the PSD for this transaction. The host retains the PSD's challenge to authenticate itself to the PSD as shown by 500B. This ensures that the message was not tampered with. It verifies that the challenge received is the challenge sent. It verifies that the host's registers are the same as the local data of registers. These above two steps authenticate the host to the PSD as shown by 500E in FIG. 5. The client software signs the challenge that the PSD sent, and also the local record of the customer's ascending and descending registers. It then sends this to the PSD. It sends cleartext of the challenge and the transaction message and sends an HMAC of all of the above, using the shared HMK as shown by 500C. The PSD performs the transaction as shown by 500F.

In one embodiment, the checkpoint concept operates in the following manner. Each module retains in its memory records relating to the three most recent transactions that modified a PSD package. For example, these records include the following data items:

PSD meter ID
Transaction type
Transaction amount
PSD AR value
PSD DR value
Module serial number
Date/time stamp (for record replay detection)
Module total amount reset
Module total amount printed
Module total amount refunded The record of the most recent transaction is also output to the database and is protected from modification by a DES MAC generated using the key HMK_chkpt. When a PSD transaction is to be performed, the checkpoint record from the database is input along with the PSD package for the meter. Preferably, all IBIP commands to the modules are handled by the function sdx_dispatch. Within dispatch, the checkpoint record from the database is compared with the most recent checkpoint record stored in the module memory. If they match, it is highly likely that no switchover of the database (resulting in lost records) has occurred. The module then trusts that the PSD package is up to date and allows the IBIP command to be executed. When the IBIP command is completed, the checkpoint record is updated and output to the server for database storage along with the updated PSD package.

In the case of create indicium commands, the server first confirms that the updated records have been stored on the database before the indicium is transmitted to the client for printing. (Server transaction logs keep a record of all messages sent to clients.) In the case of the provider commanding postage value download or create refund indicium, the server reports an error if the database fails to correctly store the updated checkpoint record and PSD package.

If the comparison of internal and external checkpoint records does not match, the module will not execute the IBIP command and an error code is returned to the server. The server then sends a command called "Auto-Recover module Checkpoint" to the module. This command allows a controlled rollback to an older checkpoint if the external checkpoint record matches either of the two older checkpoint records stored in the module internal memory. The module updates its internal records using data from the accepted checkpoint and outputs audit log records to document the more recent PSD transactions that are to be discarded (transactions more recent than the accepted checkpoint). If none of the module's internal checkpoint records match the record input from the database, auto-recovery fails and an error is returned to the server. This module is now effectively inhibited from processing PSD packages and operator intervention, using the disaster recovery process, is needed to return it to operation.

In summary, the checkpoint validation and auto-recovery processes allows the module to verify that the database providing records is up to date and to automatically resynchronize the module with the database if possible.

An Audit Log Verification protects PSD Package Replay. Use of a DES MEC to authenticate a PSD package ensures that the record originated from a module with knowledge of the client's package DES MAC key. The DES MAC verifies that the data within the record has not been modified since the DES MAC was generated. But because the DES MAC cannot ensure that the record is the most recent update of the client's data, other safeguards need to be used to prevent or detect substitution of a record created at an earlier time. The module addresses this problem by creating a cryptographically protected audit log entry each time a PSD package is modified by a module. The command scaaeCreateAuditEntry is used to create the audit record. An Audit Log Verification protects PSD Package Replay. Use of a DES MEC to authenticate a PSD package ensures that the record originated from a module with knowledge of the client's package DES MAC key. The DES MAC verifies that the data within the record has not been modified since the DES MAC was generated. But because the DES MAC cannot ensure that the record is the most recent update of the client's data, other safeguards need to be used to prevent or detect substitution of a record created at an earlier time. The module addresses this problem by creating a cryptographically protected audit log entry each time a PSD package is modified by a module. The command scaaeCreateAuditEntry is used to create the audit record.

The initialize cryptocard or update cryptocard commands perform the initializations. Limits are set for the minimum and maximum value of indicium that can be printed. The USPS certificate authority public key certificate is loaded. The provider public key is loaded. Private keys used during new customer registration are loaded. These commands are issued by the Security Officer.

The initialize PSD command assigns the device ID, set the postal registers to zero and generates the PSD public keys. This command is not authenticated but can only be executed once in the life of a PSD.

The authorize PSD command loads the PSD's public key certificate. The PSD's certificate is authenticated by the CA certificate, and the device ID and public key from the certificate are verified to match those contained in the PSD package.

The configure PSD command enters the new customer's customer ID and receives the encrypted secrets from the customer. The module decrypts the secrets using VRSK_i-post. Preferably, this command is not authenticated but the response returned to the customer is DES MAC'ed by the module with the CDSK_client key just received. The customer PC software verifies this DES MAC to ensure that the module has received the CDSK_client key correctly.

The authorize customer command enters the originating zip code after the server receives the meter license and then the maximum descending register limit is set. This command is authenticated as a provider role command from the provider's signature using the key UDSK_auth.

As described above, the cryptographic modules use roles and services to control access to the module and to specify which services (commands) are available to the user. Services of concern are those that access security parameters or postal financial data protected by the module. Each module supports many roles. In one embodiment, access control is accomplished as follows.

Authentication may be accomplished by using a secure session. For example, the roles of Security Officer, Key Custodian, Administrator, and Auditor are authenticated after a secure session between the user's PC and the module has been established. When the user issues an scasmopenSession command, application software on the user's PC and corresponding software in the module perform the session opening process. An anonymous Diffie-Hellman key generation protocol is used to establish a set of session keys (triple DES keys for encryption and MAC'ing) that are used during the session. The session keys are not used directly but instead unique keys, derived from the session keys, are used for each successive message.

Once a secure session is established, the user sends the scaacLogon command containing the user ID and user password. The module uses its access account database to verify the user data received and to select the role that this user is allowed to enter. The user can now send the module any command allowable for the selected role. In one embodiment, the module design limits each user to a single role and will only allow one user to be logged on at a time.

Session management provides security services to the communications between the host and the module. Session management will establish a secure channel between the host application and the module application. This channel provides authentication and optional confidentiality for the data exchanged through it. In particular, all command requests and responses, except those for opening a session, are protected by a MAC. This provides authentication to the command. The host and module can verify that it is their counterpart that issued the command because no other entity can generate the MAC. Optionally, the command data can also be encrypted. This provides confidentiality to the channel.

All commands from the host are initiated by a user that is authorized to execute this command on the module. That is, all host-initiated commands require an active user with an appropriate role (authorized to issue the given command). Except for Default role, this implies that a user (with that role) should be currently logged on. For all users with roles other than Default, the session management is closely tied to user logon. A session should be established before the logon and it lasts while the user is logged on. The session can be terminated after the user logs off. Logon fails if no session is established; session termination fails if a user is still logged on. Similarly, any module command that requires session security (encryption or a MAC) is aborted if this mechanism is not used.

An active session is instantiated by active session master keys. These keys are exchanged between host and module application at session set-up, and they are destroyed at session termination. All data transmitted between the host and the module within a certain session is protected by these session master keys. All data is authenticated (by means of a MAC); in addition, some data is encrypted to preserve confidentiality.

Preferably, session master keys are not used directly. Instead, a temporary key is derived from a session master key for each transmission. This transaction key is then used to MAC or encrypt the transmitted data. The transaction keys are derived as a one-way function of the session master keys and a nonce (e.g., a transaction sequence counter). This set-up with session master keys and derived transaction keys is straightforward, and it protects the session master key. The transaction keys are protected by limiting the amount of ciphertext available for attacks. In addition, even if they would be revealed, the use of a good one-way function together with nonce for the derivation of the transaction keys are sufficient to secure the session master key.

The Session Master Keys are obtained from an anonymous, unauthenticated key exchange. In one embodiment, the key exchange protocol is an anonymous (ephemeral-ephemeral) Diffie-Hellman protocol executed between the host application and the module application. The system parameters (a strong prime p, and a generator g) are fixed. That is, they are hard-coded into the software at both ends. This protocol establishes a shared secret that can be used to create a secure channel between the two end entities.

Anonymous Diffie-Hellman does not provide authentication of the end entities or key confirmation. However, the module can implicitly authenticate the host via user logon and application data authentication provided from outside of the module. Similarly, the host implicitly authenticates the module by verifying that it can process the application data. Finally, key confirmation is achieved at the first exchanged message.

Session Management functions include:
Session Management Services
  Open Session
  Close Session
Session Security:
  Compute Session MAC
  Verify Session MAC
  Session Encrypt
  Session Decrypt Role Access may be accomplished by Command Authentication. Because many customers need to be provided rapid access to the module, commands from each customer are individually authenticated to provide access control. Each customer has a DES MAC key (CDSK_client) and generates a DES MAC for each command sent to the module. The module uses its copy of CDSK_client from the customer's PSD package to perform the command authentication. This meets the requirements for identity-based role authentication. Individual command authentication ensures that each customer is authorized to enter the customer role and that the command is an authorized service of the customer role.

The provider role also uses command authentication. Provider commands are signed with the key VDSK_auth. The e-commerce server provides the interface to the USPS infrastructure and also functions as the provider when interacting with PSD Packages. When a customer's postal license is approved, the provider sends an authorize_customer command to the module to store the licensing zip code and maximum descending register value in the customer's PSD Package. Completion of the authorize_customer command places the PSD Package in the leased state, allowing it to begin operating.

When the e-commerce server is notified that the customer has deposited funds to buy postage, a download postage value command, signed by the provider key, VDSK_auth, is sent to the module. The Certificate Authority role is used to load the PSD's public key certificate. This command (authorize PSD) is authenticated when the signature on the certificate provided with the command is authenticated by the CA certificate contained in the module.

Some commands from the server to the module do not require authentication. These commands are used to prepare a PSD for operation , to request status from a PSD, or to facilitate system operation, for example. None affect data within operating PSD packages.

When the server receives a message from the client requesting an indicium, it forwards the request to the module using the create indicium command. Whenever a client's PSD package is required to perform a module service, the server provides it to the module with the command. The PSD package and the client-provided data elements for the indicium are then used by the module in the following way:

1. The indicia signing key token is decrypted and the DES MAC key is derived from it. This key is used to verify the DES MAC for the package.
2. The PSD state is checked. Preferably, the package should be in the leased state for this command to be executed.
3. The meter number in the command should match the meter number in the PSD package.
4. The challenge included in the client message is verified.
5. The key token containing the client secrets is decrypted and the DES MAC on the client's request is verified to authenticate the client with his PSD package. This also authenticates the command into the user role.

After the above checks are completed, the module is assured of the identity of the client making the request, and is certain that it has a valid PSD package for that client. The module can now perform the requested register modification process.

6. The value of the indicium is then checked to ensure it is within the minimum and maximum limits enforced by the module.
7. The DR is checked to see if it contains sufficient value for the indicium.

If the above tests are successfully completed, the module completes the indicium creation process:

8. The indicium value is subtracted from the DR and added to the AR.
9. The data elements for the indicium are assembled and the indicium signature is generated.
10. The message that will be sent to the client is assembled. In addition to the indicium, this includes the challenge received from the client in the indicium creation request and a new challenge generated by the module that will be returned in the next message from the client. A DES MAC for this message is generated using the client's CDSK_client key.
11. The PSD package and checkpoint record are updated and DES MAC's are generated for both.
12. The audit log record is then generated.

Figure 8:
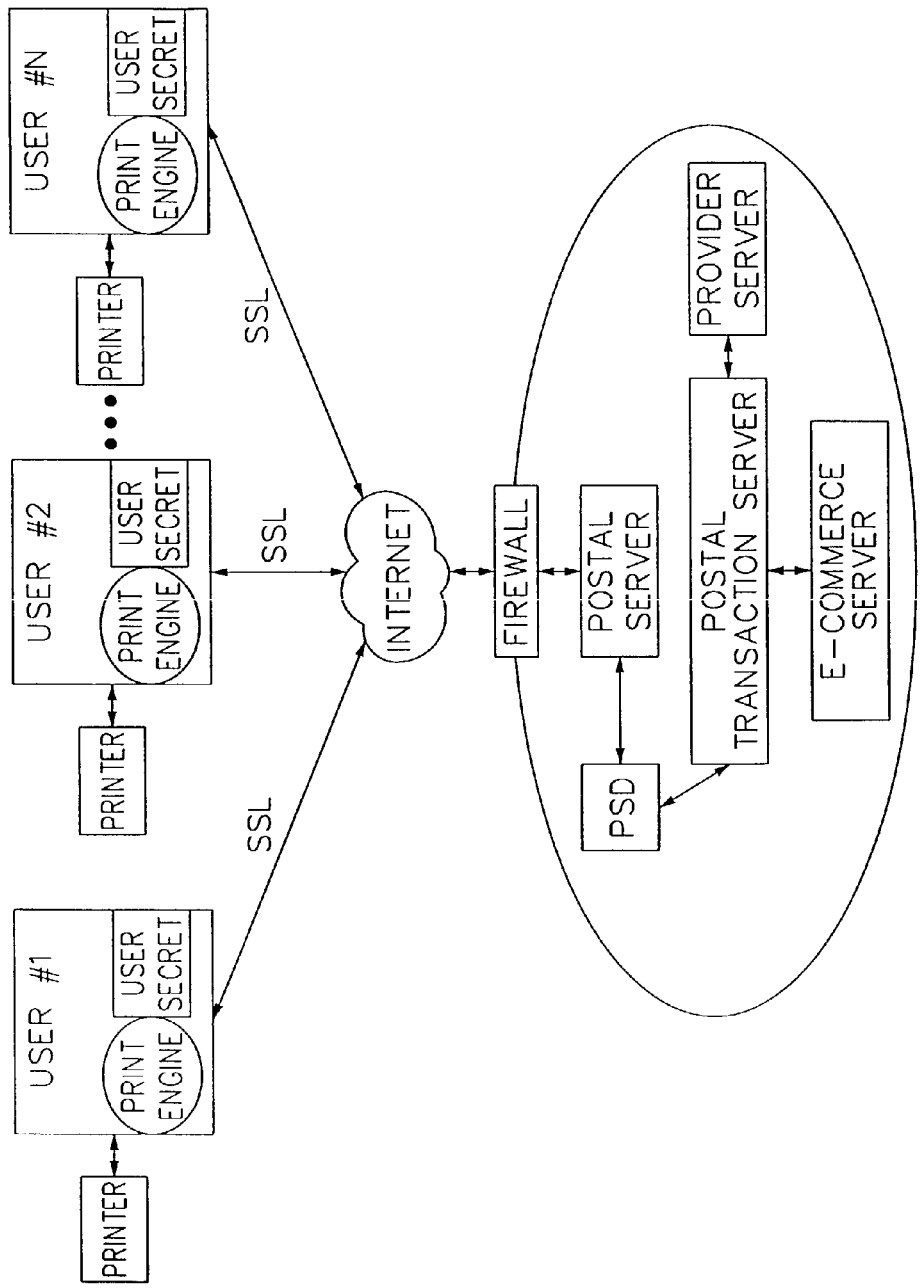
FIG. 8 is an exemplary diagram of multiple user PSD according to one embodiment of the present invention.

To broaden the appeal of the IBIP architecture to the small business and enterprise market, one embodiment of the present invention allows multiple employees within a company to access a meter registered to that company as shown in FIG. 8. This embodiment supports such an architecture by leveraging the existing security characteristics of the Postage Server Cryptomodule. In particular, the invention employs identity-based authentication, which is needed to meet the FIPS 140-1 security level 4 requirements. As depicted in FIG. 8, multiple users within an enterprise account are connected via the Internet and a firewall to the Postal server, Postal Transaction server, Provider server, and e-commerce server.

In a single user model where there is a direct one-to-one mapping from customer to PSD, only a single secret needs to be shared between the individual and the cryptographic module. This secret allows the PSD to authenticate the communication with the user. To provide this capability for multiple users, the PSD needs to have access to their secrets as well. In this embodiment of the present invention, the PSD supports the ability to share secrets with multiple users, so that it may perform identity-based authentication of these users. To support this capability, existing services are modified for them to support multiple secrets. Preferably no change is necessary to the secure protocol the system uses to communicate with the user.

Additional user management capabilities support multiple users in a PSD. This is provided through the addition of new services needed to support the administration of a PSD's authorized users. Also, a new role called "customer administrator", is added that has the authority to perform the new services. This embodiment supports multiple users per PSD, supports multiple machines per PSD. In this embodiment, preferably, all users are within the same license. Preferably there is no additional restrictions on a user's capabilities.

In one embodiment, the system of the present invention allows multiple individuals to function as a single customer by separating the user interface function of the host system from the other core functions. An individual interacts with the machine performing the user interface function, which in turn, then communicates with the machine performing the other core functions. The machine performing all core functions of the host system, excluding the user interface, is called a gateway machine. This machine acts, on behalf of the individuals, to perform all customer functions. Multiple individuals are communicating with the gateway from different machines, each of which is performing the user interface function of the host system. These machines are called interface machines.

In this embodiment of the present invention, the gateway is performing the user authentication function. As such, the gateway is responsible for supporting secure communication between the customer and its PSD. This means that the gateway performs the authentication of all messages sent to and received from the PSD.

As previously mentioned, the gateway also performs all other core functions of the host system (excluding the user interface function). Performing these functions at the gateway provides many benefits due to its centralized nature, including consolidated usage logging and simpler configuration management.

A customer entity is responsible for the security of the host system used to access the system. In this embodiment, a gateway and one or more interface machines embody the host system. To provide the same level of security as that afforded by a single machine model, it is necessary for the communication between the interface machines and the gateway to be private and tamper-resistant with respect to the community of users accessing the host system.

When and if the interface machines and the gateway all reside on a network private to the user community sharing the PSD, typically, no additional security is necessary to protect their communication. For example, a corporate LAN is typically protected with a firewall that prevents the machines within the private network from being accessed externally.

Figure 9:
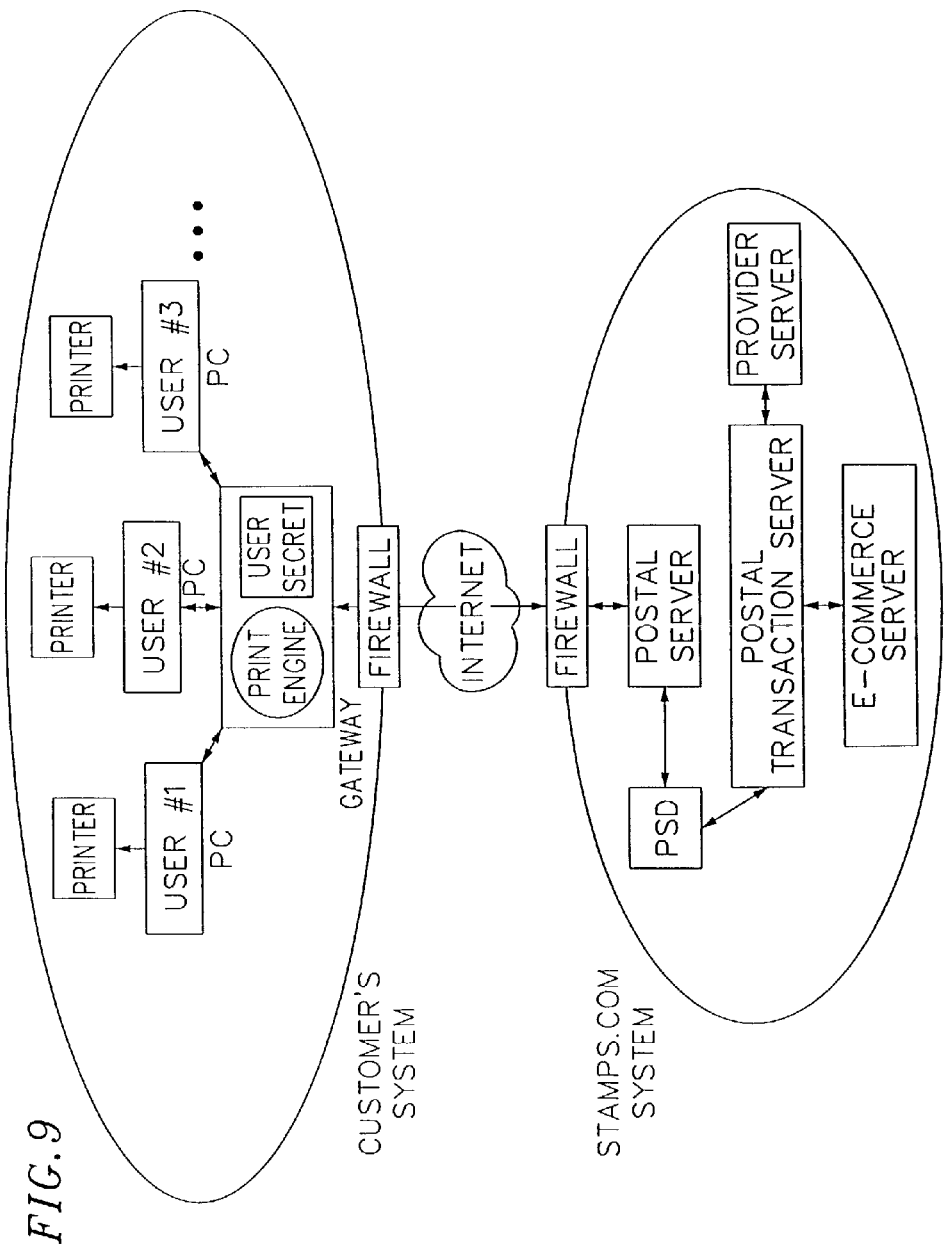
FIG. 9 is an exemplary diagram of multiple users using a gateway server according to one embodiment of the present invention.

In this embodiment, the mechanism by which a customer submits a request to purchase postage to the provider infrastructure is performed on the gateway machine. Additionally, the corresponding purchase approval and download of postage value to the PSD is performed by the provider infrastructure and is preferably unaffected by the introduction of the gateway component. FIG. 9 shows multiple users using a gateway server to generate secure indicium bitmaps. Users can be connected to the gateway system via a private network or using a secure channel such as SSL if they are using a public network to access the gateway system. Users can print the indicium generated from the gateway system using network printers or local printers that are available. Also, they can use printers connected to the gateway system.

In one embodiment, an IBI solution that allows users to use IBI from within a standard web browser tool is used. However, running in the browser environment where the UI and potentially code are delivered dynamically over the Internet brings with it additional security requirements. Improperly designed browser-based IBI systems could allow a number of attacks over the network that are not possible in an application-based system. These include the theft of indicia, substitution of values in indicia (printing something different than the user requested), substitution of values in postage purchases, and the theft of personal information. Generally, printing of indicia can be broken down into the following exemplary steps: entry of values into UI, generation of indicium by PSD, and Printing.

Figure 10:
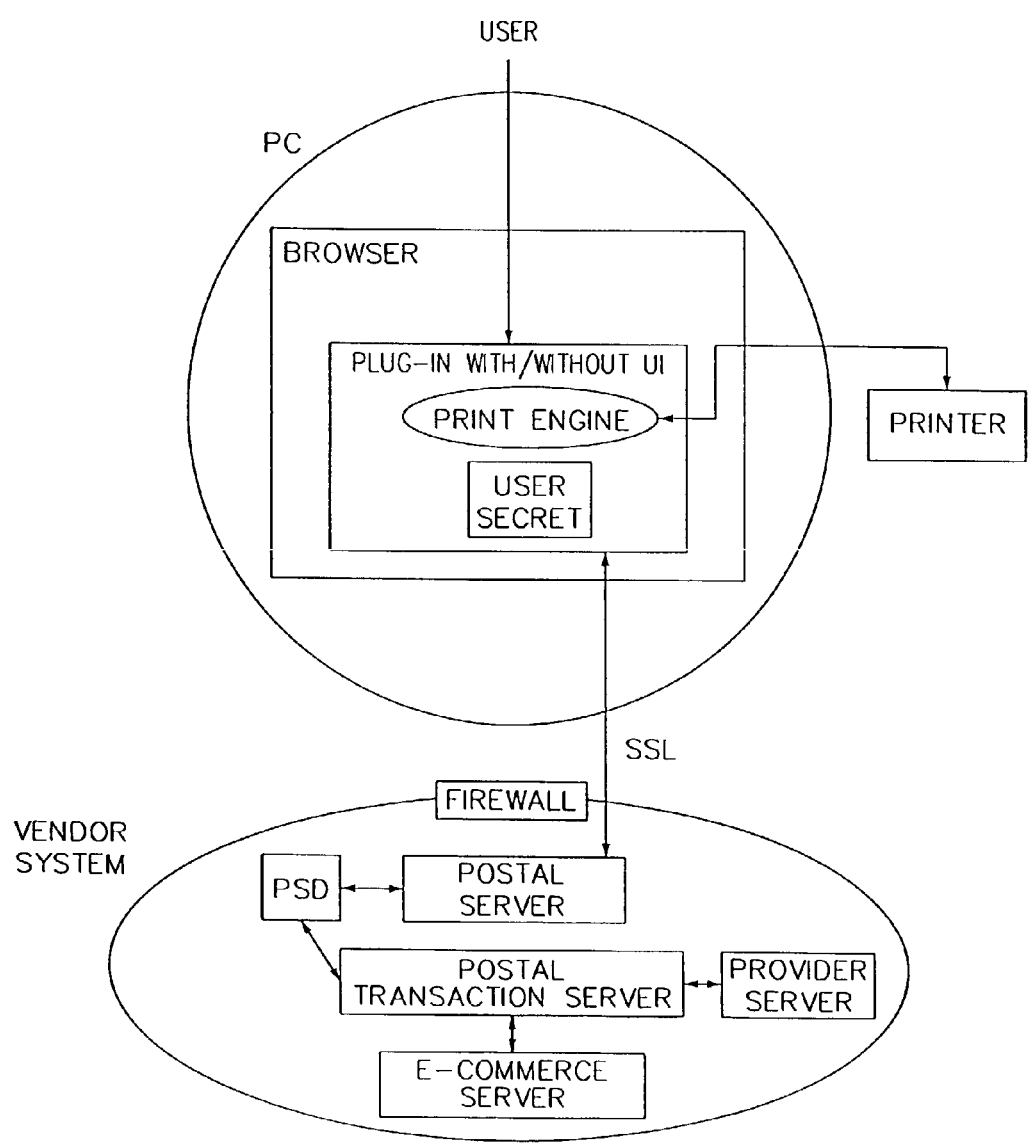
FIG. 10 is an exemplary diagram of a browser-based design with or without a UI according to one embodiment of the present invention.

Typically, the security of an IBI system is dependent on the security of the steps above. In an application-based product these steps are either contained within one cryptoboundary or protected by a private, tamper resistant communication mechanism (e.g., SSL). There is a high degree of assurance that what is requested is what is printed and that no one is able to intercept the indicium. A browser plug-in that displays its own native code UI for collecting data for the indicium and prints the indicium itself is shown in FIG. 10. This browser offers the same protections as an application. Untrusted code (e.g., JavaScript) cannot access the data in the UI and transparently modify or steal it.

A UI-less (also known as, "headless") browser plug-in that generates and prints indicia with the UI provided by web pages is potentially unsafe. A plug-in installed in this manner is visible to all web pages, not just to pages from the original site. This allows attacks on the first arrow. Input can safely be taken from a web page, but only by providing a way to ensure only authorized pages can create and print indicia. It is possible to ensure that the plug-in is being called by an authorized web page by having the plug-in check the browser's Document Object Model to check to see if the page was delivered by SSL (to eliminate spoofing) and whether it came from an authorized domain (e.g., *.stamps.com). If both of these are true, then the plug-in can trust the web page as its UI because the web page has been strongly authenticated to be from an authorized source.

This can also be accomplished by having the customer's web browser connect to a web server (proxy) running within the same cryptoboundary, as shown in FIG. 10. Preferably, the proxy only allows connections to authorized domains via SSL. In order to ensure that the proxy is only receiving requests from authorized domains, it is necessary for the proxy to authenticate that the request came from a page it delivered to the browser. The easiest way to accomplish this is to only accept requests over the same connection the page was delivered on, but other authentication methods are possible. This browser-based design has generally greater security than application-based designs.

For authentication, each user has a unique user ID and their own password. Preferably, user administration may only be performed in the cryptographic module. Also, client transactions are authenticated to a specific user. For access control, the system is capable of granting/revoking PSD privileges (e.g., create indicia, reset password, retrieve status, retrieve UDSKpsd), and granting/revoking administrative privileges (e.g., add user, delete user, modify user, e.g. privileges, view all users). Some account features include account expiration, password expiration (enforced by client), logon failure count, and maximum total postage. Transactions associated with a specific user may be audited and administration actions are tracked in an audit trail.

Once the audit log record is generated, the server receives the audit record, the updated database records, and the indicium message to the client from the module. The server stores the audit record on the audit file server and sends the PSD package and checkpoint record to the database for storage. When the server gets confirmation that the database storage operation has been successful, the message containing the indicium is transmitted to the client application.

The create postage correction indicium command performs the correction indicia creation function. Preferably, it operates identically to the create indicium command except that it results in a correction indicium being generated.

Because redating indicia creation does not involve the PSD postal registers, the module does not perform this function. When redating of an indicia is necessary, preferably server software performs this function.

When a meter is removed from service, the create refund indicium command is used to empty the meter's DR. This command, which is a service of the provider role, is preferably sent from the provider infrastructure and signed with the provider key, VDSK_auth. Preferably, this command can only be performed if the package is in the leased state or the pwreset state. When the module receives this command the result is the creation of an indicium equal to the value remaining in the DR. Because withdrawal is a special case of a normal indicium creation operation, the module preferably performs the same series of checks as for the create indicium command, the difference being the authentication of the provider in place of the customer. As a result of this command, the AR is increased by the amount of the refund indicium and the DR is reduced to zero. The PSD package state is changed to withdrawn which inhibits this meter from any further use. The indicia data, including a signature using the client's private key, is output to the server to allow the remaining funds to be credited to the client's account. The updated PSD package, checkpoint record, and audit log record, are output to the server for storage.

VBI value download messages are sent from the provider infrastructure to the PSD. When a customer deposits funds into their account, this triggers the provider's server (the provider software) to generate a VBI value download message to the customer's PSD. This message is a service of the provider role and is signed by the provider key, VDSK_auth. The message contains the meter number, control total value (from the last successful resetting), and the VBI download value. The module performs the following steps.

1. The provider signature on the message is verified.
2. The PSD package is authenticated by checking its DES MAC.
3. The PSD state is checked. Preferably, it should be in the leased state or pwreset state.
4. The meter number in the command must match the meter number in the PSD package.
5. The control total in the message must equal the sum of the AR and DR from the PSD package.
6. A check is made to ensure that the DR will not exceed a predetermined value (in one embodiment, $500) after the new VBI is loaded. A check is also made to ensure that the AR will not exceed predetermined value after the new VBI is spent.
7. If the above tests pass, the module increments the DR by the VBI amount contained in the message.
8. The PSD package and checkpoint record are updated and DES MAC's are generated for both. These are output to the database server for storage.
9. The audit log record is generated and output to the server for storage on the audit file server.

Audit support provides functions that enable secure logging of all (sensitive) actions. The security requirements include the authenticity of the entries, completeness, and the inability to insert (fraudulent) additional entries. For reasons of storage space availability, the storage of the entries happens outside the module. Therefore, the security features are built into the audit entries themselves. To avoid involvement of the originating module (or cloning of the related keys) audit is public key based meaning, the audit entries are digitally signed. To address performance concerns, this is implemented as follows.

Figure 7:
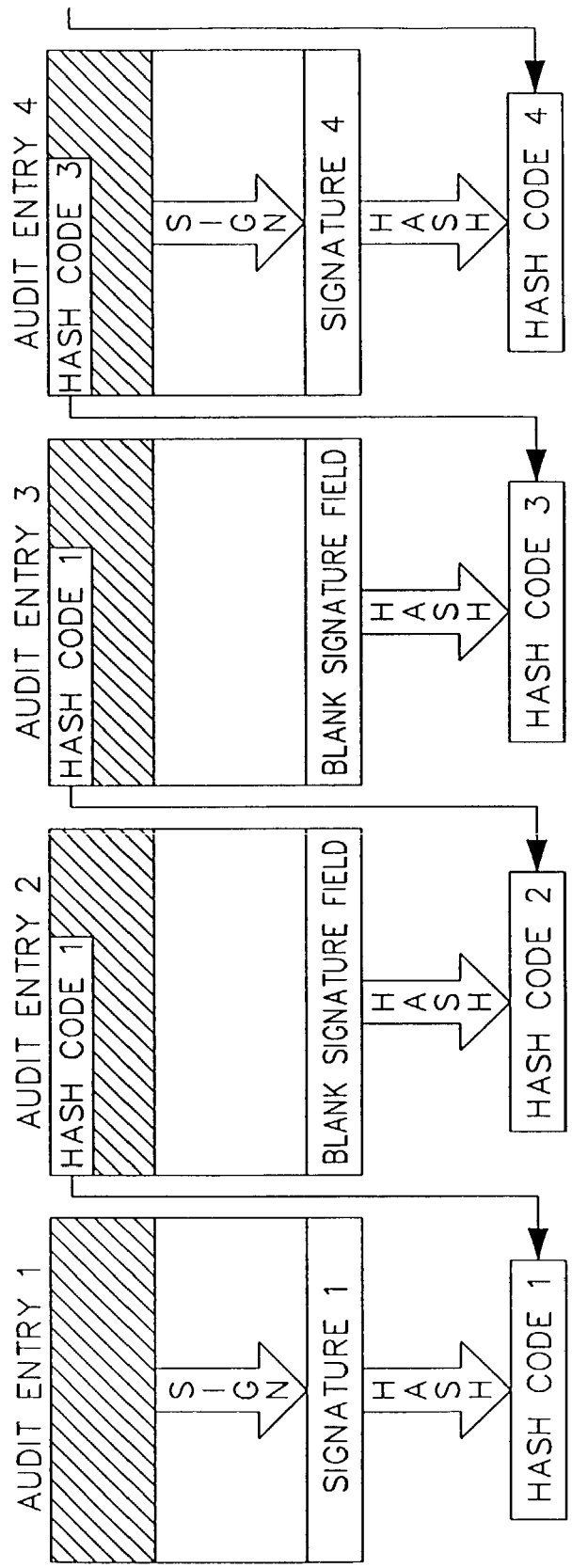
FIG. 7 is an exemplary diagram of audit chaining according to one embodiment of the present invention.

Instead of signing each individual audit entry, the entries are securely chained, and only selected entries in the chain are digitally signed. The security of the chaining mechanism then makes sure that any previous entries in the chain are implicitly authenticate as well. This chaining can be achieved by means of a hash function: each entry also contains a hash code of the previous entry. Modification of any entry in the chain before a given one then requires finding a second value that hashes to the same hash code. (This is finding a second pre-image for the used hash function.) That is, the hash code provides a link back to the previous entry in the audit chain, and implicitly to the entire pre-existent audit chain. This is depicted in FIG. 7. In FIG. 7, the arrows between the (identical) hash codes indicate the linking back through the chain.

The only remaining risk is that the last few entries before a crash may be unsigned (and thus forgeable). This risk can be mitigated by forcing a signature for certain (more sensitive) actions, in addition to forcing a signature on a periodic, recurring basis (for example, each 100 entries) as well as for the first command after a reboot.

All sensitive actions generate an audit entry. Audit entry creation functionality are exposed to the module applications such that audit entries for all sensitive actions can be created. This is the responsibility of each of the functions themselves. Audit entries are available immediately at completion of the sensitive action, to avoid losing audit information due to a crash following it. This is done by providing the entry as a output parameter of the command itself. Storage is the responsibility of the host application. (the SCA layer can provide the tools to verify authenticity and completeness; given the absence of sufficient storage capabilities within the module, there is no way to guarantee availability of audit entries. Therefore, this is left to the host application.)

Audit is started at the earliest possible moment, that is, in the Start Initialization command that effects the exit from Uninitialized state. This means that all sensitive actions following that event can be audited. During the Start Initialization command an Audit Signing Key (DSA) is generated. This event, and anything sensitive that follows can be audited by creating an audit entry.

In one embodiment, an audit entry includes:
Audit record sequence number
Hash of the previous audit record
Identity of software module requesting generation of the audit record
Identity of the command requesting generation of the audit record
The user ID (if a user is logged on to the module)
The user role (if a user is logged on to the module)
The current state of the module
The persistent state of the module
Date/time stamp
The reason code
Data to be stored in the audit record (dependent on the requesting command)
Signature (if required by the requesting command)

After the above data elements are prepared for output, a SHA-1 hash for the record is computed and is stored in the module so that it can be included in the next generated audit record. An audit entry is chained to the previous entry by the hash of the previous entry, as shown in FIG. 7. The chaining is enforced by the module by always storing the last hash in persistent memory. The register used for this is initialized to all-zero (20 bytes) for the first entry.

The chain of audit records begins when the start initialization command is sent to a new module. This first command to the module generates the DSA audit signing key pair (VD-SK_audit and UDSK_audit) and uses it to sign the first audit log record. Audit records for commands that affect the module (initialize cryptocard, checkpoint commands, etc) are always signed. Commands that affect a PSD package are not signed but include the hash of the previous record to create a trusted chain of audit records between records that are signed. The server requests a signature on every several records, for example, every one hundredth record. The public key for authenticating audit record signatures, UDSK_audit, is extracted from the module using the ExportAuditKey command. This command can only be executed by the Auditor role.

If an audit entry cannot be generated correctly and in its entirety, this is considered an error. Since the audit chain should not be broken, all data that is correctly obtained is returned in the audit entry. In addition, the command that just finished execution cannot be undone anymore. Therefore, the command results are returned to the caller (and eventually, the host) only if the error is non-fatal and the output processing can be performed (i.e. does not require Session Security commands). In general, no additional commands should be executed anymore, so the state is set to Error.

In case the audit chain is still unbroken, the error is not fatal, and may be recoverable through a reboot. (i.e., Persistent state is not set to error.) If the hash chain is broken, the audit is permanently damaged (reliability of any entries younger than the latest signature before the error is somewhat questionable). In this case, the error is fatal, and both Current and Persistent state are set to Error. This is not recoverable, except through a reinitialization of the module.

To avoid continued operation with damaged audit creation capability, the first command after a reboot should be audited, with a forced signature. This ensures that permanently damaged audit creation capability allows the execution of at most one command after rebooting. Since no sensitive functionality can be accessed directly at reboot (e.g., at least a session and a user logon are required), this ensures that no sensitive commands can be executed with damaged audit entry creation capabilities. In summary, audit entry creation only leads to command failure if a fatal error is encountered. If the error is non-fatal, an incomplete audit entry is returned for the command. In addition, the command's results are returned to the caller if their output processing can be performed (i.e. does not require Session Security commands). Also, audit entry creation set the state to Error in case of failure to deliver a complete entry. This error is fatal (non-recoverable except through re-initialization) in case the linking with the existing audit chain is lost. (This occurs only if the previous hash or the sequence number are unavailable.). This is implemented by setting both Current and Persistent state to Error. This error is recoverable through rebooting in all other cases. This is implemented by setting only Current state to Error (Persistent state is not modified). The first command after booting should always generate a signed audit entry. This ensures that no sensitive commands are executed if the audit is permanently faulty.

The Audit Support Commands include:
Export audit key
Create a new audit key
Create audit entry. This command has a flag to indicate forcing of signature.
In addition, the Start Initialization command performs the initialization of the Audit (as well as general module initialization) and as such is grouped in the Audit Support module.

External storage (external to the module) and management of the audit database is entirely up to the host; neither SCA nor SHL can play a role in that. In one embodiment, the postal servers store redundant copies of the audit log records on a mirror disk. Storage directly to disk is considered to be more reliable that storage on the database server which is accessed through the LAN. Storing the audit records separately from the PSD package database also protects against all data being lost if the database should suffer a catastrophic failure.

A proper audit verifies the completeness of the audit chain, by verifying all hashes in the chain, starting from the last verified signature, and ending at the most recently created signature. In addition, all signatures encountered should be verified. Finally, the hash of the most recently created audit entry should be logged (manually) to ensure that replacement of the entire chain will be detected. For example, in FIG. 7, if Audit Entry 4 were the last entry, one would verify Signature 1, Hashes 1 through 4 (establishing that the chain is unbroken) and Signature 4. (If Audit Entry 2 were signed as well, that signature should be verified as well.) The Auditor would then log Hash 4 as verified (e.g., written in an audit report) such that the next audit can start at Signature 4. (One may still want to verify that all earlier entries are present.)

Provider software, running on the e-commerce server, verifies the integrity of the audit log records at predetermined time intervals. First, the chain of records from each module is verified by checking all hash values and authenticating the necessary signatures. Next, the records from all module can be combined and sorted by meter number and time to view the history of each meter. Because each PSD's AR value is recorded in the audit record after each PSD transaction, a database replay attack, which would rollback the AR to an earlier value, can be detected. If the audit log verification process fails for any reason, the Security Officer is notified, for example, by e-mail. The verification starts at the most recent entry and work back towards the entry logged for the previous audit, or the start from the entry logged for the previous audit and work forward to the most recent entry.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A system for providing public key infrastructure security in a computer network comprising:
a user terminal coupled to the computer network;
a user transaction data record assigned to the user, wherein the user transaction data record includes a raw state, an unleased state, an assigned state and a leased state, and a data element indicating a present operational state of the user transaction data record including one of the raw state, the unleased state, the assigned state and the leased state, wherein only a predetermined type of commands are allowed to be executed on the user transaction data record for each operational state;

a private key, and a public key assigned to a user for encrypting and decrypting the user transaction data record;

a database remote from the user terminal for securely storing the encrypted user transaction data record, and the private key and the public key; and a cryptographic device remote from the user terminal and coupled to the computer network including a computer executable code to encrypt and decrypt the data in the user transaction data record utilizing the stored private key and the public key in the database, and to execute one or more of the commands that are allowed for the present state of the user transaction data record.

2. The system of claim 1, wherein the private key is encrypted when it is stored in the database.

3. The system of claim 1, wherein a respective security device transaction data related to a user is loaded into the cryptographic device when the user requests a service.

4. The system of claim 1, wherein the cryptographic device is configured to authenticate the identity of the user and verify that the identified user is authorized to assume a role and perform a corresponding operation.

5. The system of claim 4, wherein the assumed role is a security officer role to initiate a key management function.

6. The system of claim 4, wherein the assumed role is an administrator role to manage a user access control database.

7. The system of claim 4, wherein the assumed role is a provider role to withdraw from a user account.

8. The system of claim 4, wherein the assumed role is a user role to operate on a value bearing item.

9. The system of claim 4, wherein the assumed role is a certificate authority role to allow a public key certificate to be loaded and verified.

10. The system of claim 4, wherein the cryptographic device includes a computer executable code for supporting multiple concurrent users and maintaining a separation of roles and operations performed by each user.

11. The system of claim 4, wherein the cryptographic device stores information about a number of last transactions in a respective internal register.

12. The system of claim 11, wherein the database stores a table including the respective information about a last transaction, a verification module to compare the information saved in the device with the information saved in the database.

13. The system of claim 1, further comprising a digital certificate stored in the database and assigned to a user when the user registers with the system.

14. The system of claim 1, wherein the cryptographic device is configured for digitally signing a certificate.

15. The system of claim 1, wherein the cryptographic device is configured for encrypting data.

16. The system of claim 1, wherein the cryptographic device is configured for decrypting data.

17. The system of claim 1, wherein the database includes a user profile for the user.

18. The system of claim 17, wherein the user profile includes username, user role, password, logon failure count, logon failure limit, logon time-out limit, account expiration, password expiration, and password period.

19. The system of claim 4, wherein the cryptographic device is capable of performing one or more of Rivest, Shamir and Adleman (RSA) public key encryption, DES, Triple-DES, DSA signature, SHA-1, and Pseudo-random number generation algorithms.

20. The system of claim 4, wherein the cryptographic device stores information about a number of last transactions in an internal register and compares the information saved in the register with the information saved in a memory before loading a new transaction data.

21. A method for providing public key infrastructure security in a computer network comprising the steps of:

assigning a private key and a public key to a user for authenticating a user transaction data record, wherein the user transaction data record includes a raw state, an unleased state, an assigned state and a leased state, and a data element indicating a present operational state of the user transaction data record including one of the raw state, the unleased state, the assigned state and the leased state, wherein only a predetermined type of commands are allowed to be executed on the user transaction data record for each state;

storing the private key, the public key and the user transaction data record in a database remote from the user terminal;

encrypting the data in the user transaction data record assigned to the user utilizing the stored private key and the public key in the database; and controlling the user transaction data record to execute one or more of the commands that are allowed for the present state of the user transaction data record.

22. The method of claim 21, further comprising the step of storing a digital certificate and assigning the stored digital certificate to a user when the user registers with the system.

23. The method of claim 21, further comprising the step of loading the user transaction data related to a user into a cryptographic device when the user requests to operate on a value bearing item.

24. The method of claim 23, further comprising the step of verifying that the requesting user is authorized to assume a role and to perform a corresponding operation.

25. The method of claim 24, wherein the assumed role is an administrator role to manage a user access control.

26. The method of claim 24, wherein the assumed role is a user role to perform expected IBIP postal meter operations.

27. The method of claim 24, wherein the assumed role is a certificate authority role to allow a public key certificate to be loaded and verified.

28. The method of claim 24, further comprising the steps of supporting multiple concurrent operators and maintaining a separation of roles and operations performed by each operator.

29. The method of claim 3, further comprising the steps of:

storing information about a number of last transactions in a respective internal register of each of the one or more cryptographic devices;

storing a table including the information about a last transaction in the database;

comparing the information saved in the respective device with the respective information saved in the database; and loading a new transaction data if the respective information stored in the device compares with the respective information stored in the database.

30. The method of claim 21, further comprising digitally signing a certificate.

31. The method of claim 21, further comprising encrypting data.

32. The method of claim 21, further comprising decrypting data.

33. The method of claim 21, further comprising the step of storing a user profile for a plurality of users.

34. The method of claim 33, wherein the user profile includes username, user role, password, logon failure count, logon failure limit, logon time-out limit, account expiration, password expiration, and password period.

35. The method of claim 21, wherein the cryptographic function is one or more of Rivest, Shamir and Adleman (RSA) public key encryption, DES, Triple-DES, DSA signature, SHA-1, and Pseudo-random number generation algorithms.

* * * * *